US008045464B1

(12) United States Patent
Nucci et al.

(10) Patent No.: US 8,045,464 B1
(45) Date of Patent: Oct. 25, 2011

(54) SIP-BASED VOIP TRAFFIC BEHAVIOR PROFILING METHOD

(75) Inventors: Antonio Nucci, Burlingame, CA (US); Supranamaya Ranjan, Palo Alto, CA (US); Zhi-Li Zhang, Minneapolis, MN (US)

(73) Assignee: Narus, Inc., Sunnyvale, CA (US)

( * ) Notice: Subject to any disclaimer, the term of this patent is extended or adjusted under 35 U.S.C. 154(b) by 632 days.

(21) Appl. No.: 12/210,029

(22) Filed: Sep. 12, 2008

Related U.S. Application Data

(62) Division of application No. 11/540,893, filed on Sep. 28, 2006, now Pat. No. 7,441,429.

(51) Int. Cl.
*H04J 1/16* (2006.01)
*G06F 15/173* (2006.01)
*G06F 15/16* (2006.01)

(52) U.S. Cl. ........ 370/231; 370/232; 370/237; 709/224; 709/225; 709/226; 709/229

(58) Field of Classification Search .......... None
See application file for complete search history.

(56) References Cited

U.S. PATENT DOCUMENTS

| 5,835,490 | A | 11/1998 | Park et al. |
| 7,441,429 | B1 | 10/2008 | Nucci et al. |
| 2004/0228352 | A1* | 11/2004 | Constantinof ........ 370/395.21 |
| 2006/0087973 | A1 | 4/2006 | Huang |
| 2007/0150950 | A1* | 6/2007 | Aaron et al. ............ 726/22 |
| 2007/0180113 | A1* | 8/2007 | Van Bemmel ............ 709/226 |
| 2007/0206579 | A1 | 9/2007 | Voith et al. |
| 2007/0233896 | A1 | 10/2007 | Hilt et al. |
| 2007/0255828 | A1 | 11/2007 | Paradise |
| 2008/0016157 | A1 | 1/2008 | Sahraie et al. |

OTHER PUBLICATIONS

U.S. Appl. No. 12/268,676, filed Nov. 11, 2008, Nucci et al.
U.S. Appl. No. 12/334,926, filed Dec. 15, 2009, Nucci et al.
Dantu, R. and Kolan, P. Detecting Spam in VoIP networks. Proceedings of USENIX, SRUTI '05: Steps for Reducing Unwanted Traffic on the Internet Workshop [online], Jul. 7, 2005 [retrieved on Aug. 28, 2009]. Retrieved from the Internet: <http://www.usenix.org/event/sruti05/tech/full_papers/dantu/dantu.pdf>, pp. 31-37.
Geneiatakis, D., et al. Novel Protecting Mechanism for SIP-Based Infrastructure against Malformed Message Attacks: Performance Evaluation Study. Proc. of the 5th International Conference on Communication Systems, Networks and Digital Signal Processing (CSNDSP'06) [online], Jul. 2006 [retrieved on Aug. 28, 2009]. Ret. from: <http://www.wcl.ee.upatras.gr/csndsp/CD/contents/Sessions/Presentations/A12%20-%20Internet%20atacks%20-anomaly%20detection/A12.4.PDF>, p. 261.

(Continued)

*Primary Examiner* — Melanie Jagannathan
(74) *Attorney, Agent, or Firm* — Fernandez & Associates, LLP

(57) ABSTRACT

With the widespread adoption of SIP-based VoIP, understanding the characteristics of SIP traffic behavior is critical to problem diagnosis and security protection of VoIP services. A general methodology is provided for profiling SIP-based VoIP traffic behavior at several levels: SIP server host, server entity (e.g., registrar and call proxy) and individual user levels. Using SIP traffic traces captured in a production VoIP network, the characteristics of SIP-based VoIP traffic behavior in an operational environment is illustrated and the effectiveness of the general profiling methodology is demonstrated. In particular, the profiling methodology identifies anomalies due to performance problems and/or implementation flaws through a case study. The efficacy of the methodology in detecting potential VoIP attacks is also demonstrated through a test bed experimentation.

5 Claims, 43 Drawing Sheets

OTHER PUBLICATIONS

Geneiatakis, D., et al., "SIP Message Tampering: TheSQL Code Injection Attack," in: Proc. of the 13th IEEE International Conference on Software, Telecommunications and Computer Networks (SoftCOM 2005) (Split, Croatia, Sep. 2005), pp. 176-181.

Hickey, A.R., For VoIP, too many threats to count. SearchSecurity.com: Information Security News [online], Dec. 15, 2005 [retrieved on Dec. 21, 2006]. Retrieved from the Internet: <http://searchsecurity.techtarget.com/originalContent/0,289142,sid14_gci1153718,00.html?SEevlg65>.

McGann, S. and Sicker, D.C. "An Analysis of Security Threats and Tools in SIP-Based VoIP Systems." in: 2nd Workshop on Securing Voice over IP (Washington DC, Jun. 1, 2005).

Reynolds, B. and Ghosal, D. Secure IP Telephony using Multi-Layered Protection. Proceedings of Network and Distributed System Security Symposium (NDSS'03) [online], Feb. 2003 [retrieved on Aug. 28, 2009]. Retrieved from the Internet: <http://www.isoc.org/isoc/conferences/ndss/03/proceedings/papers/3.pdf>.

Reynolds, B. et al., "Vulnerability Analysis and A Security Architecture for IP Telephony," in: IEEE GlobeCom Workshop on VoIP Security: Challenges and Solutions (Dallas TX, Dec. 3, 2004).

Rosenberg, J., et al. SIP: Session Initiation Protocol. Internet Engineering Task Force (IETF) RFC 3261 [online], Jun. 2002 [retrieved on Aug. 28, 2009]. Retrieved from the Internet: <www.ietf.org/rfc/rfc3261.txt>.

Wosnack, N. A Vonage VoIP 3-way call CID Spoofing Vulnerability. Hack Canada [online], Aug. 13, 2003 [retrieved on Aug. 28, 2009]. Retrieved from the Internet: <www.hackcanada.com/canadian/phreaking/voip-vonage-vulnerability.html>.

Wu, Y.S., et al, "SCIDIVE: A Stateful and Cross Protocol Intrusion Detection Architecture for Voice-over-IP Environments," in: Proceedings of the 2004 International Conference on Dependable Systems and Networks (DSN'04) (Split, Croatia, Jun. 2004), pp. 433-442.

Pesch, D., et al.,"Performance evaluation of SIP-based multimedia services in UMTS," Computer Networks: The International Journal of Computer and Telecommunications Networking vol. 49, No. 3 (Oct. 19, 2005), pp. 385-403.

Kang, H. J. et al., "SIP-based VoIP Traffic Behavior Profiling and Its Applications," in: Proceedings of the 3rd annual ACM Workshop on Mining Network Data (San Diego CA, Jun. 12, 2007), pp. 39-44.

* cited by examiner

SIP-BASED VOIP TRAFFIC BEHAVIOR PROFILING METHOD

CROSS REFERENCE TO RELATED APPLICATIONS

This application is a divisional application of U.S. patent application Ser. No. 11/540,893 filed Sep. 28, 2006 now U.S. Pat. No. 7,441,429 and entitled "SIP-based VoIP Traffic Behavior Profiling Method."

BACKGROUND

1. Field

The present invention relates to computers and computer networks. More particularly, the present invention relates to SIP-based VoIP traffic behavior profiling method.

2. Description of Related Art

Voice over IP (VoIP) allows users to make phone calls over the Internet, or any other IP network, using the packet switched network as a transmission medium rather than the traditional circuit transmissions of the Public Switched Telephone Network (PSTN). VoIP has come a long way since its first rudimentary applications provided erratic yet free phone calls over the unmanaged Internet. VoIP technology has reached a point of being comparable in terms of grade voice quality with traditional PSTN yet consuming only a fraction of the bandwidth required by TDM networks. The maturity of VoIP standards and quality of service (QoS) on IP networks opens up new possibilities for carrier applications. Consolidation of voice and data on one network maximizes network efficiency, streamlines the network architecture, reduce capital and operational costs, and opens up new service opportunities. At the same time, VoIP enables new multimedia service opportunities, such as Web-enabled multimedia conferencing, unified messaging, etc, while being much cheaper.

The session initiation protocol (SIP) is the Internet standard signaling protocol for setting up, controlling, and terminating VoIP sessions. In addition to IP telephony, it can also be used for teleconferencing, presence, event notification, instant messaging, and other multimedia applications. SIP-based VoIP services require infrastructure support from entities such as SIP registrars, call proxies, and so forth which are collectively referred to as SIP servers. A SIP registrar associates SIP users, e.g., names or identities called SIP user resource indicators (URIs) with their current locations, e.g., IP addresses. A SIP call proxy assists users in establishing calls, called dialogs in the SIP jargon, by handling and forwarding signaling messages among users, and other SIP servers. In practice, a physical host (SIP server) may assume multiple logical roles, e.g., functioning both as registrars and call proxies.

SIP is a text-based request-response protocol, with a syntax very similar to HTTP, operating on the well-known ports such as tcp/udp 5060 (for the standard SIP) and 5061 (for the secure SIP, SIPs). Hence SIP messages are either of type request or response. The method field is used to distinguish between different SIP operations. The most common methods include REGISTER (for user registration), INVITE, ACK, BYE, CANCEL (these four used for call set-up or tear-down), SUBSCRIBE and NOTIFY (for event notification). Response messages contain a response code informing the results of the requested operations, e.g., 200 OK. The FROM and TO fields in an SIP message contains respectively the SIP URIs of the user where a request message is originated from (e.g., the caller of a call) or destined to (e.g., the callee of a call). In the case of a REGISTER message, both FROM and TO typically contains the SIP URI of the user where the request is originated. Other important fields include VIA and various identifiers and tags to string together various transactions and dialogs. More details can be found in Rosenberg et al., RFC 3261, June 2002 which is incorporated herein by reference.

VoIP offers compelling advantages but it also presents a security paradox. The very openness and ubiquity that make IP networks such powerful infrastructures also make them a liability. Risks include Denial of Service (DoS), Service Theft, Unauthorized Call Monitoring, Call Routing Manipulation, Identity Theft and Impersonation, among others. Not only does VoIP inherit all data security risks, but it introduces new vehicles for threats related to the plethora of new emerging VoIP protocols that have yet to undergo detailed security analysis and scrutiny. But just how serious are the threats posed to VoIP? Recently, there have been a string of attacks against either the VoIP infrastructure or end users. In one such incident, early June of 2006, two men were arrested for fraudulently routing approximately $500,000 worth of calls illegally over the VoIP network belonging to Net2Phone, a Newark, N.J., VoIP provider. Fifteen Internet phone companies were reported as the victims of this attack. More recently, ISS posted a report about a Denial-of-Service vulnerability in the IAX2 implementation of Asterisk, an open source software PBX. This vulnerability relates to the amount of time that a pending (but not yet authenticated) call is allowed to exist in memory on the server. New terms start to be coined over time just for VoIP attacks; "Vishing", is now used for phishing attacks using VoIP technology, or "Spit", now used for spam over VoIP. Hence it is imperative for Service Providers to widely deploy scalable monitoring systems with powerful tools across their entire infrastructures such as to robustly shield their VoIP infrastructure and protect their service. Passive packet monitoring and capturing devices may be deployed in the underlying network hosting VoIP services. In addition to capturing the standard layer-3 (IP) and layer-4 (TCP/UDP) header information, it may be desirable to also capture a portion of layer-7 payload containing appropriate application protocol (SIP) fields. The captured packet header and payload information is then processed and parsed for analysis and profiling. Unlike the layer 3/4 header fields which generally have well-defined and limited semantics, the layer-7 application protocol such as SIP has a variety of fields, with rich semantics that are often context-sensitive and sometimes even implementation-specific. For example, with the SIP protocol itself, the meaning of the same fields may depend on the method used. Hence a major challenge in performing layer-7 protocol analysis and behavior profiling is to determine how to judiciously incorporate application-specific semantics or "domain knowledge" to select appropriate set of key features to capture the essential behavior characteristics of the application in question.

Accordingly, there is a need for a general methodology for characterizing and profiling SIP-based VoIP traffic behavior.

SUMMARY OF THE INVENTION

A new algorithm is provided to automatically discover SIP servers, and to break down their logical functionality, e.g. registrars and call proxies. Exemplary traffic features are monitored at the server, entity and individual user levels in SIP traffic traces captured in an operational network providing a commercial VoIP service. A new algorithm is also provided based on information entropy to profile the chosen metrics over time and to generate alerts when any of the features diverges from its historical trend. These algorithms and methodology are applied to three different VoIP attacks generated in a controlled lab environment to show their efficacy.

It is an objective of the invention to provide a methodology for characterizing and profiling SIP-based VoIP traffic behavior using passive traffic monitoring to identify anomalies, diagnose problems and detect potential attacks on critical VoIP services and their infrastructure.

It is also an objective of the invention to identify anomalies, accurately diagnose problems on-fly and promptly detect and trace-back on-going attacks on critical VoIP service and their infrastructure.

It still another objective of the invention to provide a multi-level, progressively refined methodology that characterizes VoIP service activity in real-time by extracting and profiling a large variety of traffic features and metrics at three different levels: (i) server, e.g. broad-view of their behavior by monitoring and keeping statistics related to only the message types such as request vs response, etc. (ii) entity, e.g. coarse-view of the servers activity by separating their logical roles into registrar} and call proxy; and (iii) individual users, e.g. narrow-view of individual user activities such as typical average duration and length of the calls, number of calls received and made, etc.

It is yet another objective of the invention to provide a methodology to balance the speed of profiling, the resource consumption, the desired sophistication of behavior characteristics, and the level of security to be offered, based on the specific objectives and needs of the VoIP Operator.

The results reported in this paper uses three SIP traces from the above mentioned network, referred to as trace segment 1 (13:55-14:30), trace segment 2 (19:00-19:40) and trace segment 3 (19:55-20:30), respectively (the numbers within the parentheses indicate the start and end time of the traces) which are. They are of about 40 minutes or so long, captured on a OC12 link between 13:00 h and 21:00 h within a single day. (For privacy concerns, the data are properly sanitized while preserving the needed semantics for analysis.) Although the efficacy and efficiency of the claimed invention is demonstrated through these exemplary SIP traces, one of ordinary skilled in the art would appreciate that the claimed invention can be applied to any SIP traffic in general.

These and other implementations, their variations, applications, and associated advantages and benefits are described in greater detail in the attached drawings, the detailed description, and the claims. This summary does not purport to define the invention. The invention is defined by the claims.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTIONS OF THE INVENTION

Figure 1:
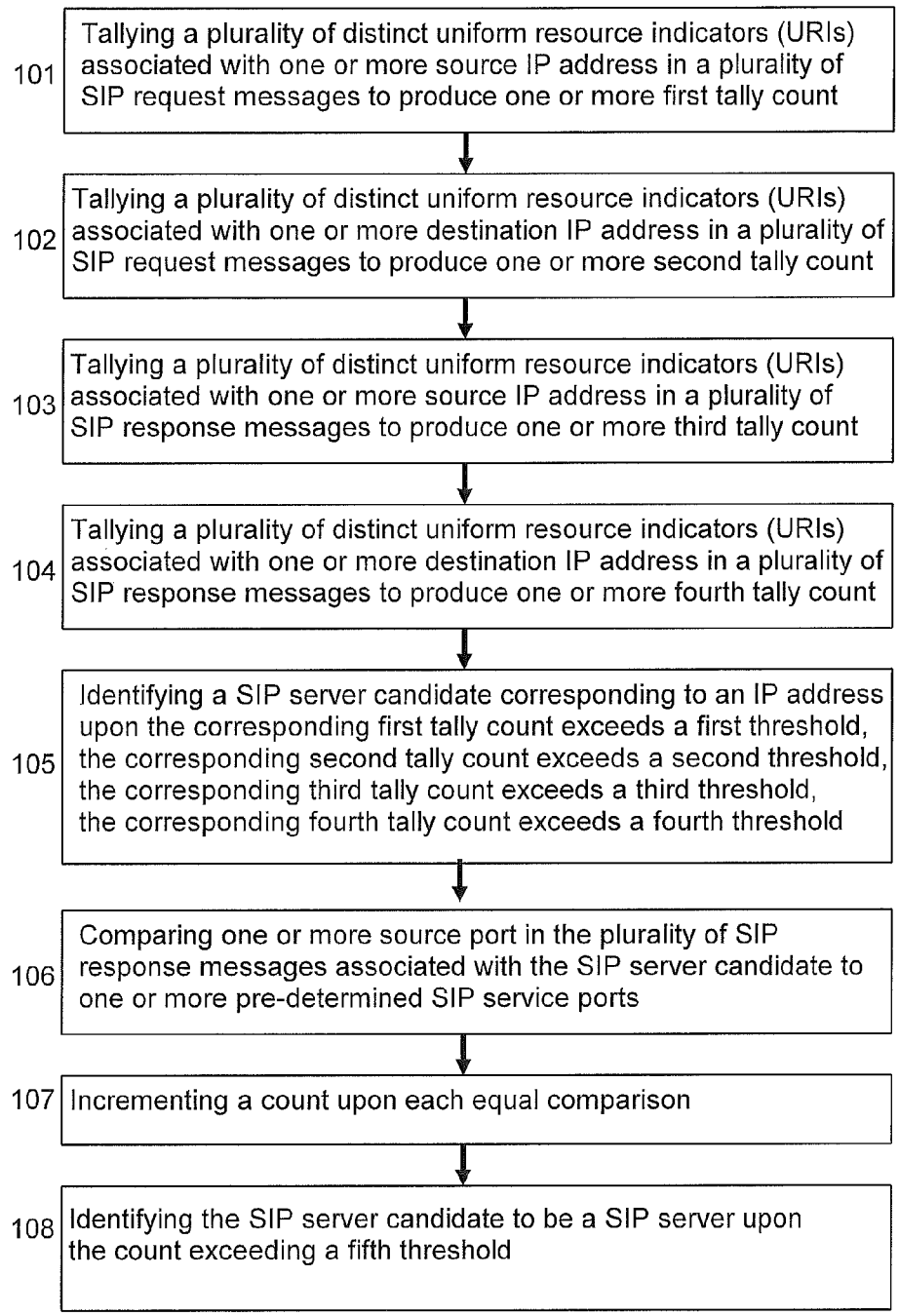
FIG. 1 illustrates a flow chart for detecting SIP servers.

To identify the IP addresses associated with SIP servers using SIP traffic traces, both application-layer (i.e., SIP) protocol information as well as network/transport layer protocol information may be used. A heuristics may be obtained by observing the role of SIP servers in SIP-based VoIP communications: typically users must register with SIP registrars; and users call signaling must go through SIP call proxy server. Hence the IP address associated with an SIP server will consistently see a large number of SIP messages going through it (i.e., with the said IP address as either the source or destination IP addresses); furthermore, a large number of distinct FROM and TO fields in the appropriate SIP messages (e.g., INVITE, REGISTER, etc.) will be associated with this IP address. An exemplary baseline algorithm for SIP call proxy discovery is shown in FIG. 1 which examines the SIP INVITE messages. An exemplary baseline algorithm for SIP registrar discovery is shown in FIG. 2 which examines the SIP REGISTER messages.

FIG. 1 illustrates a flow chart for detecting SIP servers. This process may be adapted for a variety of SIP servers, including registrar, call proxy and the like. Here, one or more first tally count is produced by tallying a plurality of URIs associated with one or more source IP address in a plurality of SIP request messages (101). One or more second tally count is produced by tallying a plurality of URIs associated with one or more destination IP address in a plurality of SIP request messages (102). One or more third tally count is produced by tallying a plurality of URIs associated with one or more source IP address in a plurality of SIP response messages (103). One or more fourth tally count is produced by tallying a plurality of URIs associated with one or more destination IP address in a plurality of SIP response messages (104). A SIP server candidate corresponding to an IP address may then be identified upon the corresponding first tally count exceeds a first threshold, the corresponding second tally count exceeds a second threshold, the corresponding third tally count exceeds a third threshold, and the corresponding fourth tally count exceeds a fourth threshold (105). Once identified, one or more source port in the plurality of SIP response messages associated with the SIP server candidate is compared to one or more pre-determined SIP service ports (106). A count is incremented upon each equal comparison (107). The SIP server candidate is then identified to be a SIP server upon the count exceeding a fifth threshold (108).

An example for the processes 101-105 illustrated in FIG. 1 can be shown as the following baseline algorithm where SIP server call proxy may be identified by examining the SIP INVITE messages. SIP server registrar may be identified using a similar baseline algorithm by examining the SIP REGISTER messages.

```
for each m ∈ M do
    if m.method == INVITE then
        x = m.sourceIP; y = m.destinationIP;
        from = m.FROM; to = m.TO;
        if x ∉ IPSet then
            x.Out_FROM = {from}; x.Out_TO = {to};
            x.In_FROM = φ; x.In_TO = φ;
        else
            x.Out_FROM = x.Out_FROM ∪ {from};
            x.Out_TO = x.Out_TO ∪ {to};
        end if
        if [| x.In_FROM |,| x.In_TO |,| x.Out_FROM |,| x.Out_TO |]
            > [α,α,α,α]then
            ProxyIP = ProxyIP ∪ {x};
        end if
        if y ∉ I PSet then
            y.In_FROM = {from};x.In_TO = {to};
            y.Out_FROM = φ;y.Out_TO = φ;
        else
            y.In_FROM = y.In_FROM ∪ {from};
            y.In_TO = y.In_TO ∪ {to};
        end if
        if [|y.In_FROM |,| y.In_TO |,| y.Out_FROM |,| y.Out_TO |]
            > [α,α,α,α]then
            ProxyI P = ProxyI P ∪ {y}
        end if
    end if
end for
```

Figure 2A:
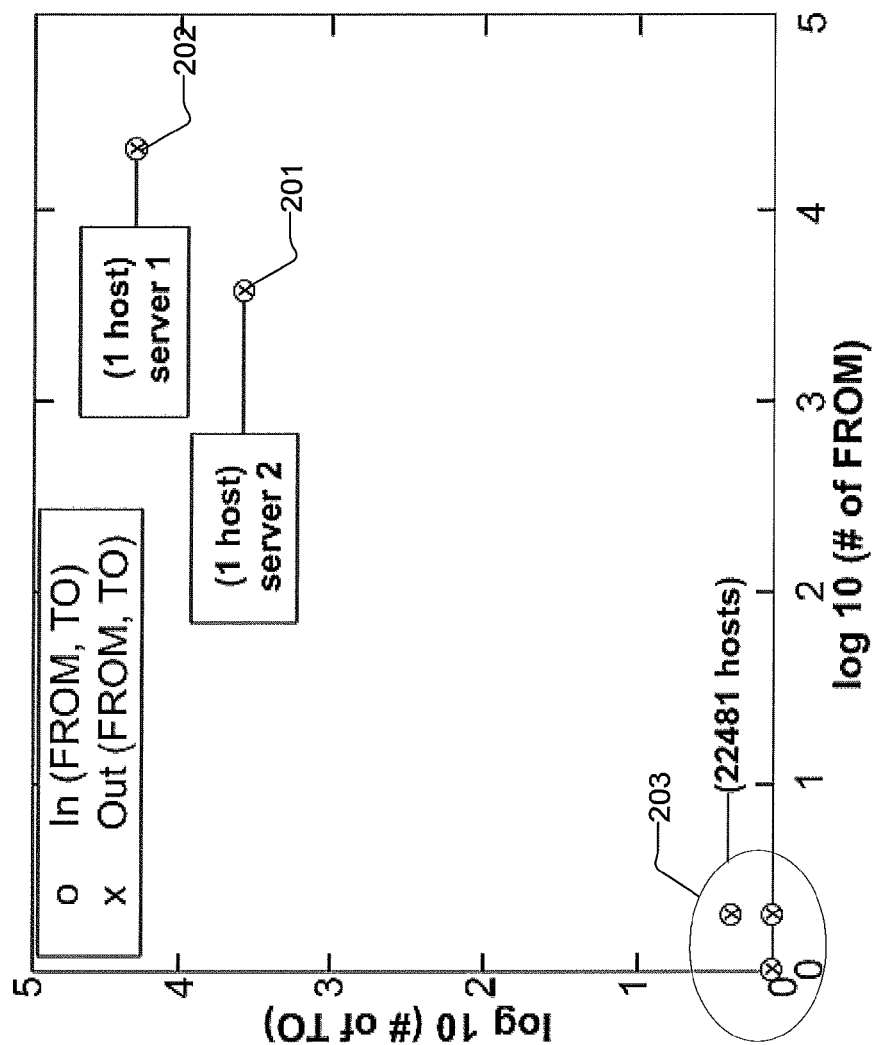
FIGS. 2A and 2B illustrate exemplary statistics of SIP traffic traces captured in an operational network providing a commercial VoIP service.
Figure 2B:
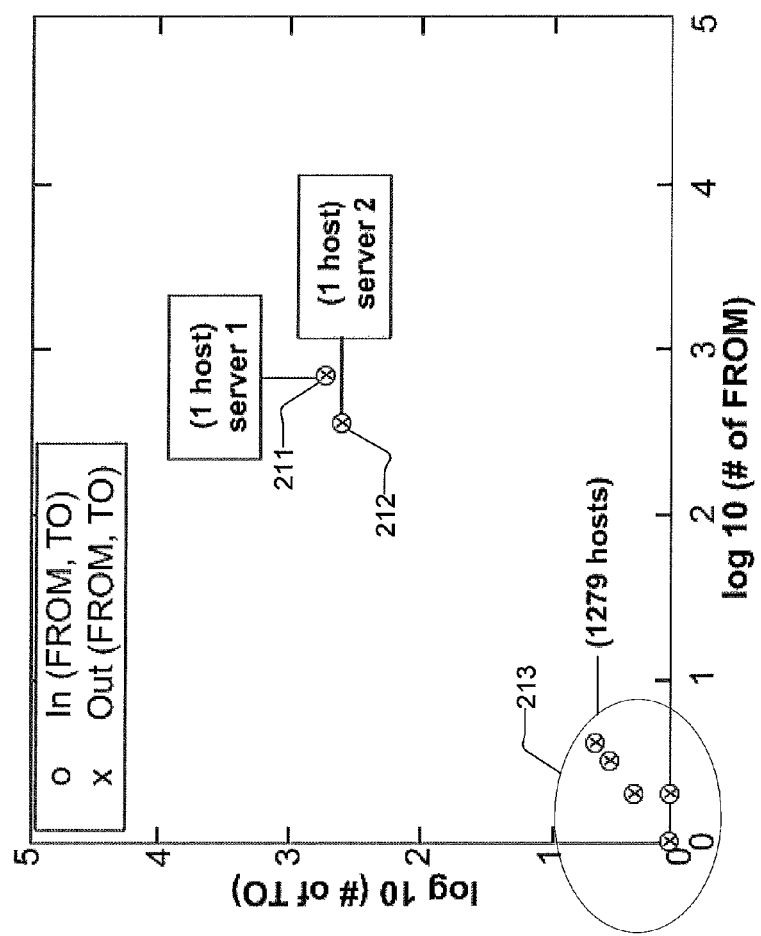

Here, for each IP address a in the SIP messages (either as the source where a is represented as x or as the destination where a is represented as y) the algorithm maintains four records, $a.In_{FROM}$, $a.In_{TO}$, $a.Out_{FROM}$ and $a.Out_{TO}$, which maintain, respectively, the set of unique users (or rather their URIs) seen in the FROM and TO fields of the SIP INVITE messages received (represented as a.In) by or sent (represented as a.Out) from a. If the number of distinct users in each of the four records exceeds a threshold alpha, then IP address a is included in the SIP call proxy candidate set ProxyIP. The threshold may be determined, for example, by plotting $In_{FROM}$ vs. $In_{TO}$ and $Out_{FROM}$ vs. $Out_{TO}$ in a scatter plot, as shown in FIGS. 2A and 2B for an example.

The above algorithm ensures the diversity of callers (FROM) and callees (TO) in both the SIP INVITE messages originating and destined to a given IP, therefore minimizes the chance of misclassifying a user in the forward mode while incoming INVITE messages are forwarded to another location, or similarly, a user in a conference mode. In both cases, the TO field of the INVITE messages will contain the URI (or its variants) of the forwarder. Hence the size of corresponding $In_{TO}$ and $Out_{TO}$ will be small (typically 1) and may be excluded from being misclassified by an appropriated set threshold (e.g. 10 or 20). However, this algorithm may misclassify a network address translation (NAT) box behind which there are many callers and callees as an SIP server. To avoid the ambiguity of a NAT box from an SIP server, additional mechanisms need to be incorporated into the baseline SIP server discovery algorithm. An exemplary algorithm for the processes 106-108 illustrated in FIG. 1 can be shown in the following example. For example, the source port of SIP response messages (e.g., responses to INVITE messages) originated from each IP (in the SIP server candidate set ProxyIP) may be verified to belong to one of the SIP service ports (e.g., 5060, 5061 as defined in the SIP RFC). If this is the case, the said IP address is considered an SIP server, otherwise it is rejected. This is because an SIP server does not initiate any call set up; it simply listens to service requests on its well-known service port and uses the service port as the source port in its response messages, whereas callers/callees behind an NAT box will use a diverse set of source ports that are likely different from the well-known SIP service ports.

The effectiveness of the baseline algorithm may be illustrated using the real SIP traffic traces. FIGS. 2A and 2B illustrate statistics of SIP traffic traces captured in an operational network providing a commercial VoIP service. FIG. 2A shows the numbers of unique FROM's vs. TO's in the SIP REGISTER messages received (i.e., $In_{FROM}$ vs. $In_{TO}$) and sent (i.e., $Out_{FROM}$ vs. $Out_{TO}$) by each IP address seen in the SIP traces. Similarly, FIG. 2B shows the numbers of unique FROM's vs. TO's in the SIP INVITE messages received and sent by each IP address seen in Trace II. Note that many hosts (i.e., IP addresses) may have the same number of FROM's and TO's, the labels on the side indicating the number of such hosts including 201, 202, 203, 211, 212 and 213. In both cases, only two IP addresses server 1 and server 2 (which are the same two IP entity addresses 201/211 and 202/212 in FIGS. 2A and 2B) have significantly higher number than the remaining IP addresses 203 and 213, which have only one or very few distinct FROM's and TO's in a 30-40 minute time interval. These two IP addresses are those of two SIP servers (in this case functioning both are registrars and call proxies) in the network, server 1 serving more users than server 2 in this 40 segment SIP trace. Hence the baseline algorithm can effectively identify the IP addresses associated with the SIP severs (registrars or call proxies) by appropriately setting the threshold (e.g., alpha=100 depending on the time interval used).

Figure 3:
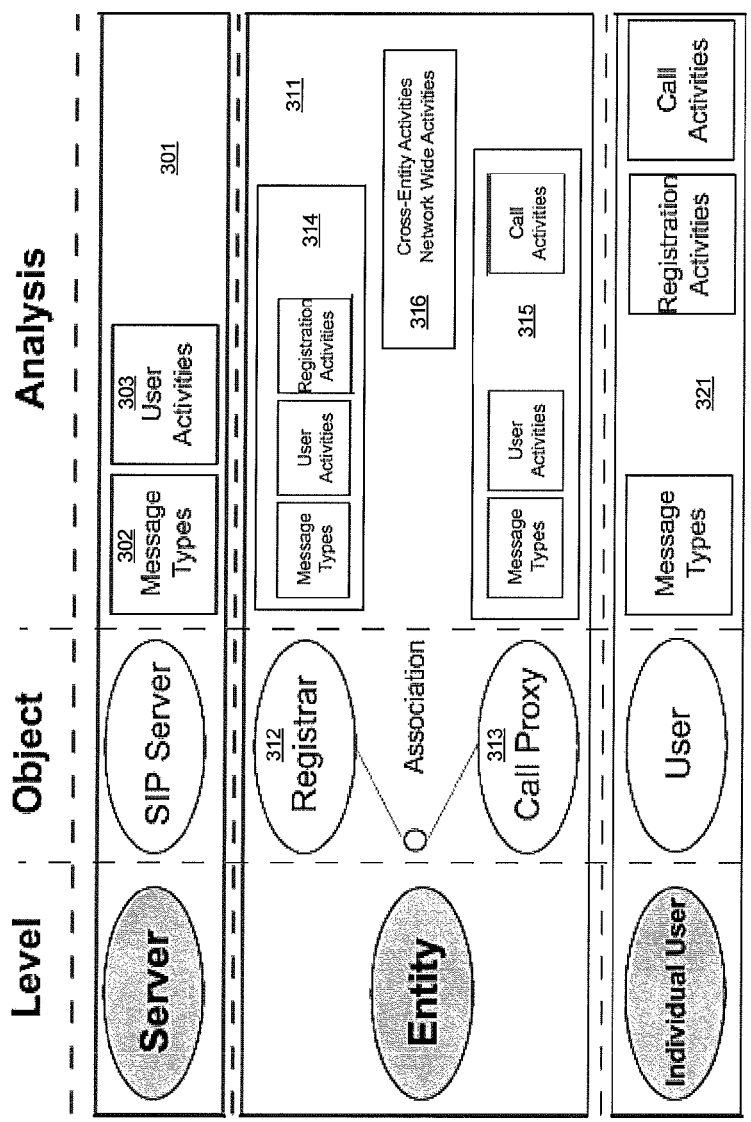
FIG. 3 illustrates an exemplary multi-level methodology for profiling SIP network traffic.

Once the IP addresses associated with the SIP servers are identified, the behavior of SIP servers may be characterized and profiled by examining the SIP messages going through them. The behaviors of SIP servers and their associated users may be characterized and profiled at three levels—server, entity and (individual) user}—by introducing a range of features and metrics from coarser granularity to finer granularity in terms of the amount of application-specific (i.e., SIP) semantic information. This multi-level, progressively refined methodology balances the speed of profiling, resources required, desired sophistication of behavior characteristics, and level of security, etc. based on the objectives and needs of an SIP-based VoIP operator. FIG. 3 illustrates a multi-level methodology for profiling SIP network traffic. At the server level 301 only aggregate features and metrics are maintained to provide a broad view of a SIP server behavior by examining only the message types 302 (e.g. request vs. response) into and out of a SIP server and extracting only coarse-grain user statistics information 303. At the server entity level 311, the logical role of a SIP server may be separated into registrar 321 and call proxy 313, as these two separate entities require a different set of features and metrics to characterize their respective behavior. Based on the SIP semantics, the method field of a SIP message may be examined to attribute it to either the SIP registrar or call proxy (e.g., a SIP REGISTER messages and its response are part of a registrar activity while a SIP INVITE message and its response are part of a call proxy activity). Features and metrics 314 and 315 may be computed for the corresponding registrars and call proxies. The activities of SIP registrars and call proxies may also be cross-examined to build cross entity associations 316. At the individual user level 321, the SIP messages may be attributed to individual users for maintaining statistics and features to characterize individual user behaviors.

Figure 4:
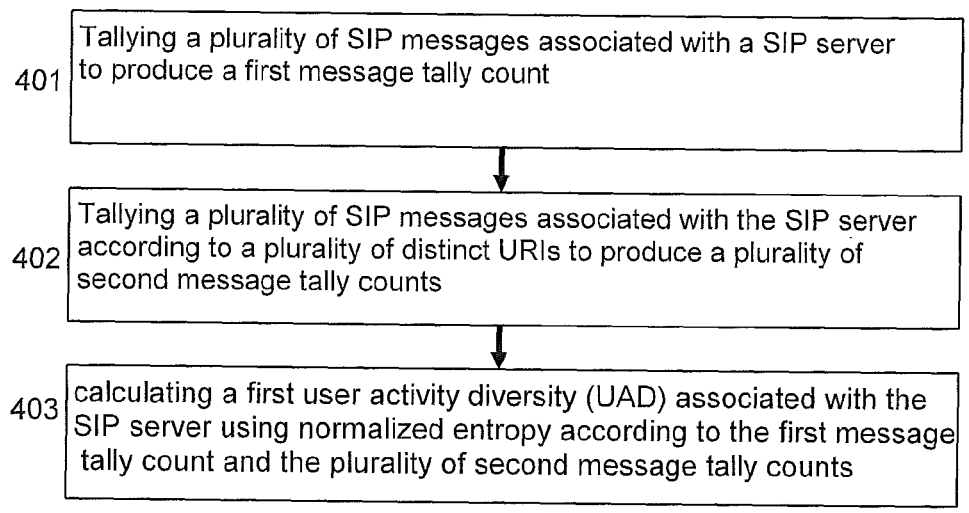
FIG. 4 illustrates a flow chart for profiling SIP network traffic.

FIG. 4 illustrates a flow chart for profiling SIP network traffic. Here, a plurality of SIP messages associated with a SIP server is tallied to produce a first message tally count (401). A plurality of SIP messages associated with the SIP server is then tallied according to a plurality of distinct URIs to produce a plurality of second message tally counts (402). A user activity diversity (UAD) associated with the SIP server is then calculated using normalized entropy according to the first message tally count and the plurality of second message tally counts (403). An example for the processes 401-403 can be shown as the following algorithm applied to the server level 301 illustrated in FIG. 3. The aggregate behavior of an SIP server may be characterized by maintaining two types of aggregate statistics and features: i) the numbers of request and response messages received (i.e., fan-in) and sent (i.e., fan-out) by each SIP server (and derivatively their corresponding ratios) is counted over a given period of time T (say, 5 or 15 minutes); ii) the number of unique users (URIs) seen in the FROM and TO fields of SIP messages, such as request messages, etc., is counted, and compute an aggregate user activity diversity (UAD) metric from the distribution of such data over T. This UAD metric is computed as follows: Let m be the total number of SIP request messages over T, and n is the total number of distinct users seen in the messages. For each unique user i, $m_i$ is the number of SIP messages with i in either the FROM or TO field of the messages. Then $p_i = m_i/m$ is the frequency that user i is seen in the SIP messages. The user activity diversity metric, UAD, is then given by the following equation:

$$UAD := \left(-\sum_i p_i \log p_i\right) \bigg/ \log m \in [0, 1]$$

where the numerator is the entropy of a histogram $P=\{p_i\}$, while the log m is its maximum entropy—the ratio of the two is the standardized (or normalized) entropy or relative uncertainty (RU). UAD thus provides a measure of "randomness" of user activities as captured by the distribution $\{p_i\}$: for $n \gg 1$, if UAD approximately equals 0, a few users dominate the SIP activities (in other words, they appear in most of the messages), whereas UAD approximately equals 1 implies that $p_i$ is on the order of $1/m$ and thus each user only appears in a few number of SIP messages (hence overall the user activities appear random). The intuitions for these two types of aggregate statistics and features are as follows: As SIP is a request/reply-based protocol, the ratio between the numbers of request/reply messages is expected to bounded and stable. Moreover, since each user must periodically register or re-register with a SIP server, and calls are initiated by human users, the number of SIP requests and the number of users are unlikely to exhibit huge variations, and user activities should in general be quite diverse and random. In the next section we see that our intuitions are born out by the results we obtained using the real SIP traces.

Another example for the processes 401-403 can be shown as the following algorithm applied to the server entity level 311 illustrated in FIG. 3. Using the method field of SIP messages, registrar-related messages (e.g., the REGISTER messages and their responses) may be separated and used to generate statistics and features for registrar behavior profiling. Similar to the server level analysis, aggregate statistics regarding the numbers (and ratios) of REGISTER and other registrar-related requests and responses received and sent by a registrar are maintained. In terms of user activities, the number (and list) of users that are successfully registered is maintained. A similar UAD metric with respect to the registrar may then be calculated. In addition to these aggregate statistics and features regarding the message types and user activities, more detailed registration analysis may also be performed. The response codes in the response messages may be examined to maintain statistics about the numbers of successful and failed registrations. The registration periods of users (i.e., the time lapses between two consecutive REGISTER messages from the same users) and the inter-arrival times of any two consecutive REGISTER request messages (from different users) may be calculated. From the former the (average) registration period of the registrar may be calculated. From the latter a (fitted) model for the user REGISTER request arrival process may be derived. Together they not only reveal the configuration of the registrar but also the temporal behavior of the registrar.

Yet another example for the processes 401-403 can be shown as the following algorithm applied to the server entity level 311 illustrated in FIG. 3. By analyzing the SIP messages related to call activities (e.g., SIP messages with the INVITE, BYE methods and their responses), statistics and features for call proxy behavior profiling may be generated. Similarly as before, aggregate statistics regarding the numbers and ratios of various call requests (INVITE, BYE CANCEL, etc.) and their responses received and sent by a registrar may be maintained. Several UAD metrics regarding the aggregate user call activities may be maintained. For example, UAD_caller, UAD_callee and UAD_caller-callee, which measures the UAD of callers, callees and caller-callee pairs. Each of these metrics is computed using the equation:

$$UAD := \left(-\sum_i p_i \log p_i\right) \bigg/ \log m \in [0, 1]$$

with appropriate defined parameters: m is the number of SIP call request messages (SIP INVITE, BYE and CANCEL requests, and i) for UAD_caller, $m_i$ is the number of SIP call request messages with user i in the FROM field, ii) for UAD_callee, $m_i$ is the number of SIP call request messages with user i in the TO field, and iii) for UAD_caller-callee, $m_i$ is replaced by $m_{ij}$ where $m_{ij}$ is the number of SIP call request messages with user i in the FROM field and user j in the TO field. Furthermore, a more detailed call analysis may be performed to maintain various call statistics and features of a call proxy. These include the number of on-going calls, completed calls (calls ended by BYE only), cancelled calls (calls ended by CANCEL only), call re-invites (an INVITE request followed by another INVITE request from the same caller to the same callee before the call is ended), and so forth, in a given time period. Statistics (average, standard deviation or distribution) regarding call durations and call request arrival rates may also be computed.

When data are available, SIP messages among different entities (e.g., between registrars and call proxies, and among call proxies) may be correlated to generate a cross-entity and network-wide view of the SIP traffic activities. For example, by correlating the registration information from a registrar and its associated call proxies, statistics and features regarding calls made among registered users of the registrar, from the registered callers to other callees (not registered with the registrar), from other callers (not registered with the registrar) to the registered callees, and from other callers to other callees may be derived. The relationship among call proxies may also be characterized.

Figure 5A:
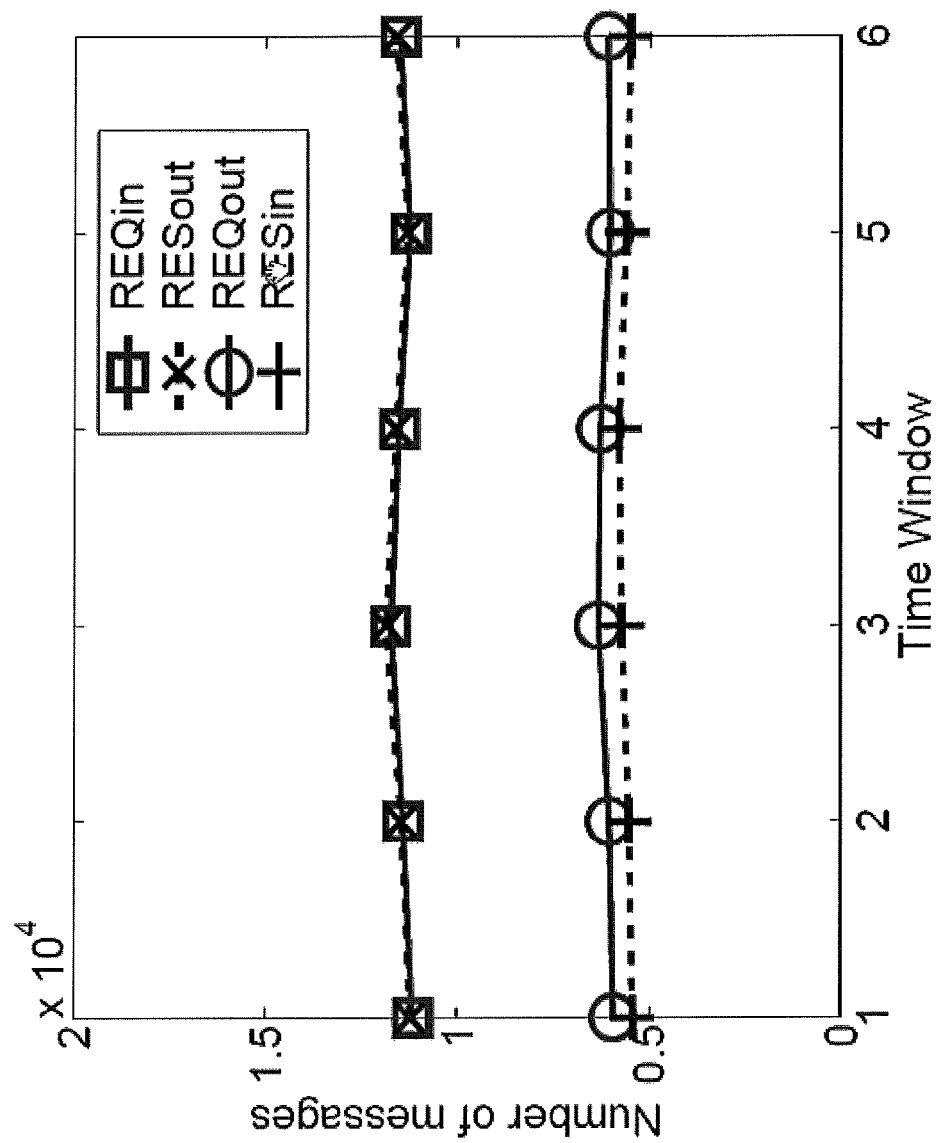
FIGS. 5A-5E illustrates an exemplary server level SIP network traffic behavior in normal operational environments.
Figure 5B:
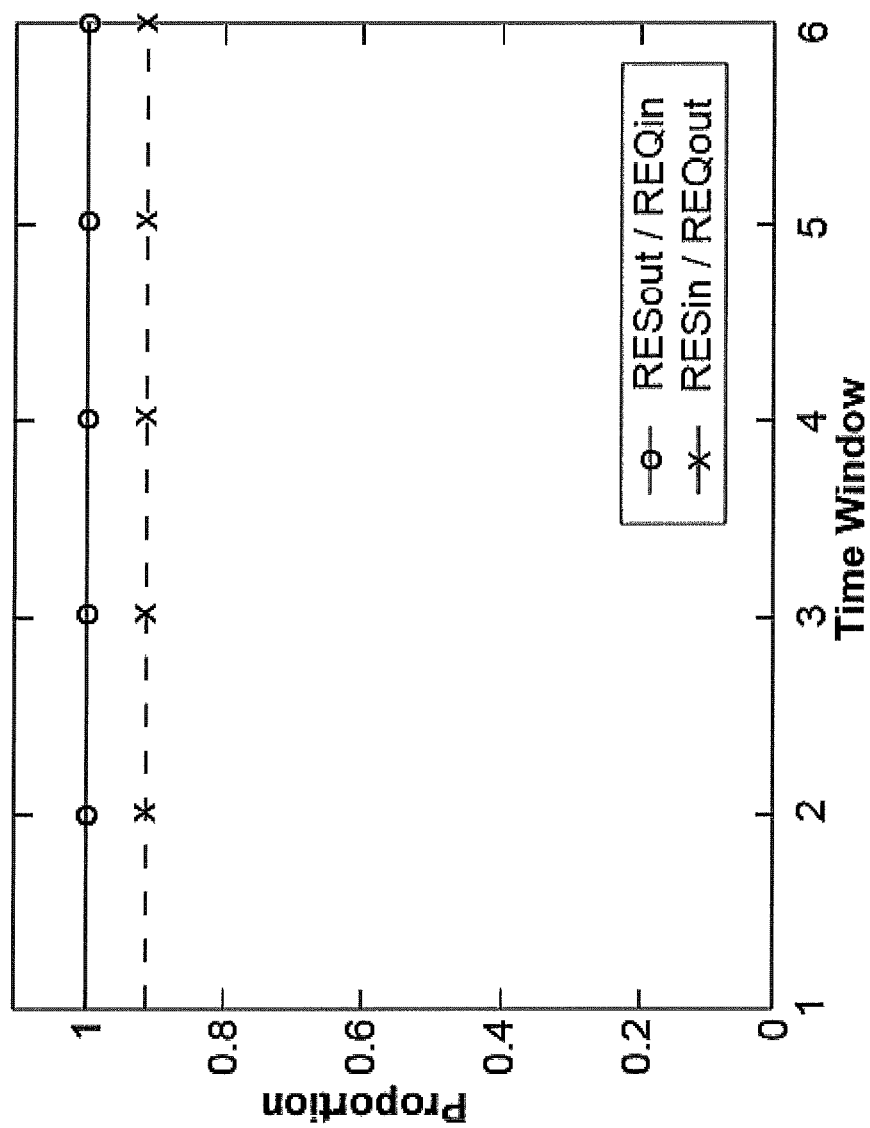
Figure 5C:
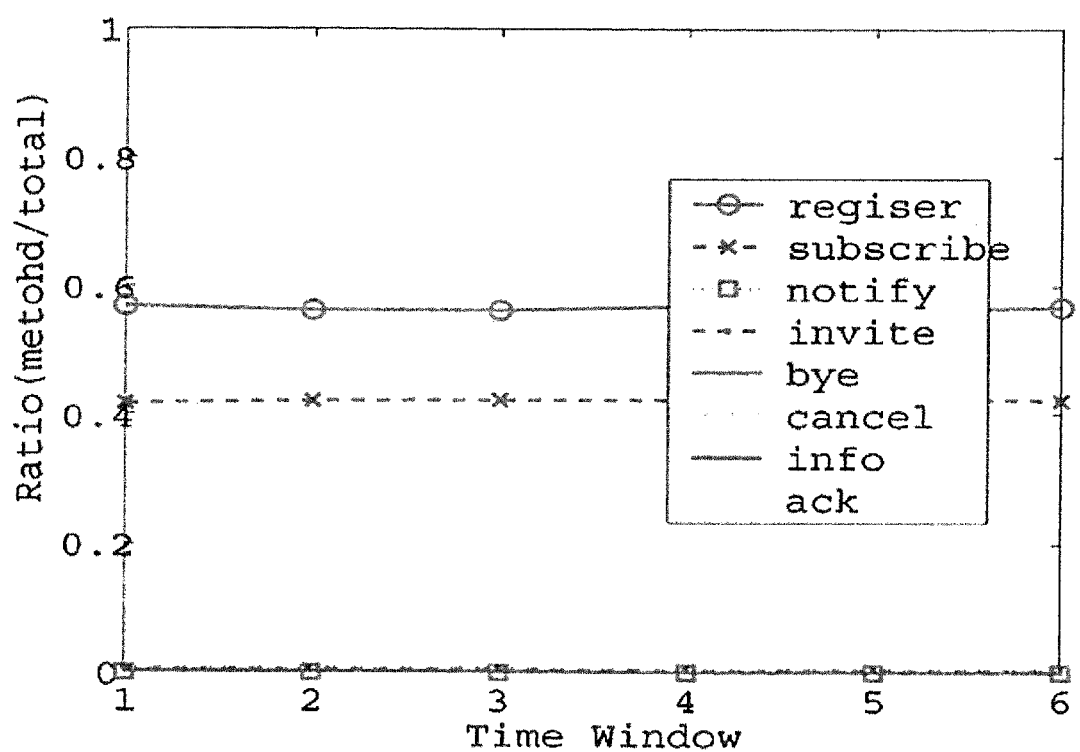
Figure 5D:
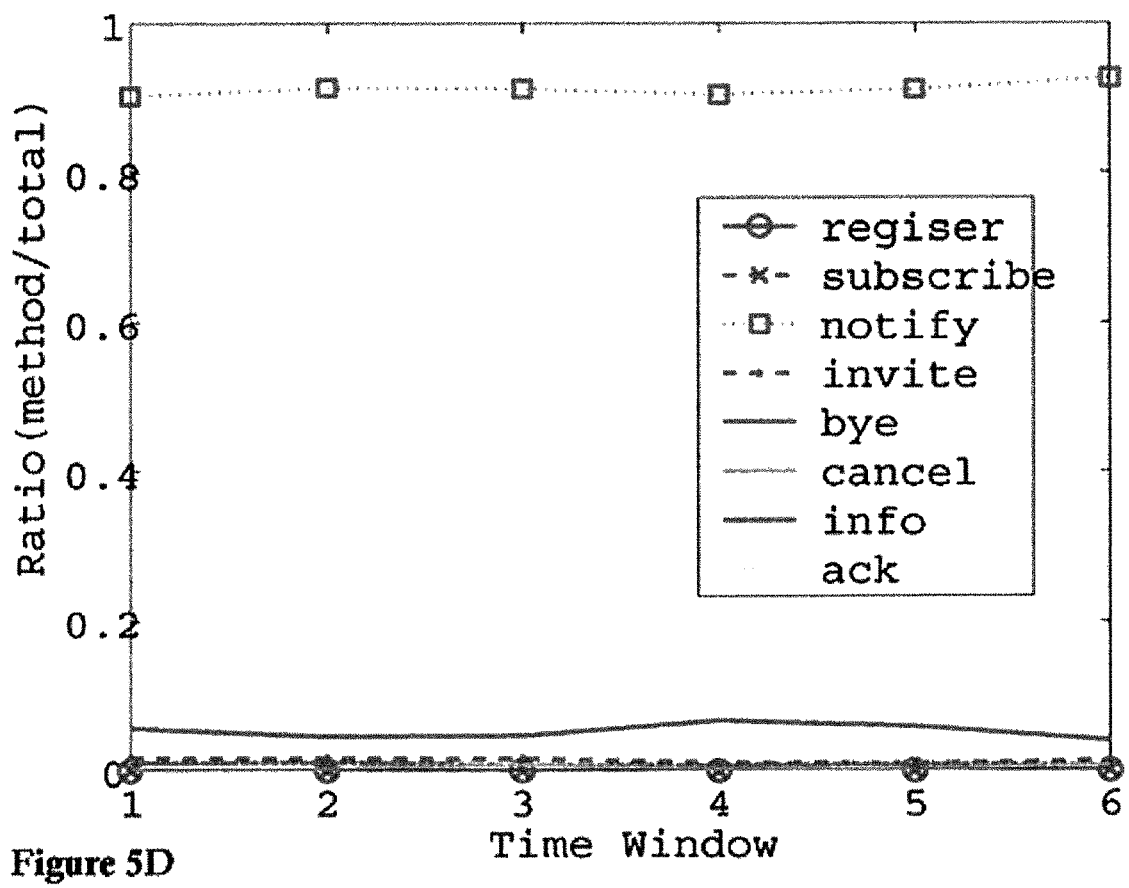
Figure 5E:
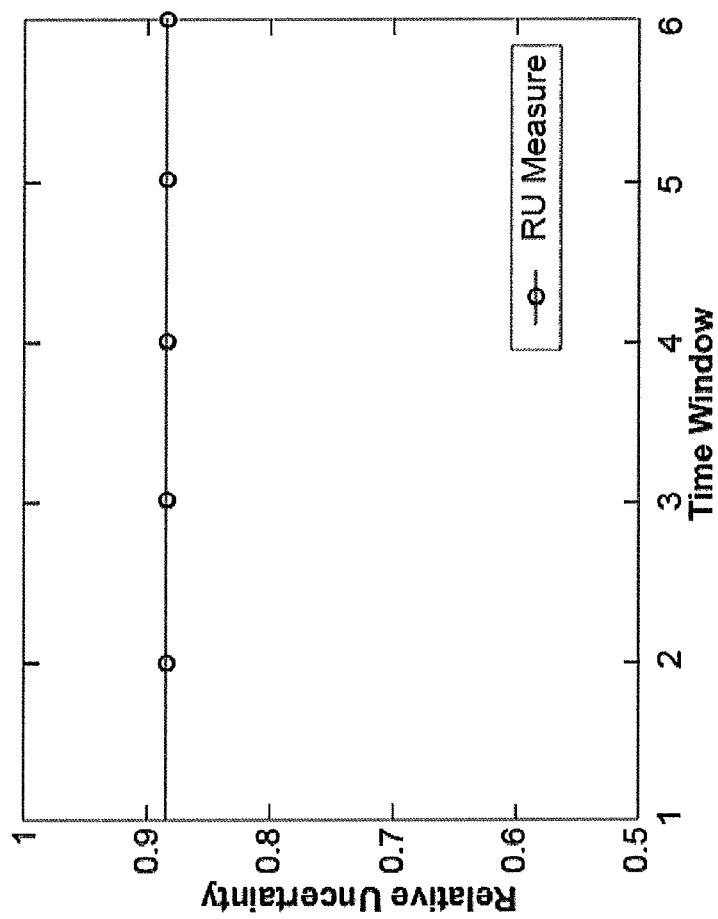

Still another example for the processes 401-403 can be shown as the following algorithm applied to the server entity level 311 illustrated in FIG. 3. If needed, statistics and features regarding the individual user activities may be maintained. For example, from the user call activities the (typical or average) number of calls made or receiver by each user u may be maintained, and the diversity of callees $UAD^u$_callee of the calls made by the user as well as the diversity of callers $UAD^u$_caller of the calls received by the user u may be computed. Other statistics such as (average) call durations may also be maintained. FIGS. 5A-5E illustrates SIP network traffic behavior in normal operational environments. Here, the general profiling methodology presented in the previous examples is applied to analyze the SIP trace 2, corresponding to server 1, to illustrate the characteristics of SIP traffic in a real VoIP. As an example, it is shown following the server level profiling 301 that in normal operational environments SIP traffic behavior tends to be very stable both in terms of various SIP message types, user registration, call and other related activities. FIGS. 5A-5E illustrates an exemplary server level SIP network traffic behavior in normal operational environments. FIG. 5A shows the numbers of request and response messages received (denoted as REQin and RESin respectively) and sent (denoted as REQout and RESout respectively) by server 1 over 5-minute time intervals in segment 2 of the SIP traces. The first and last 5 minutes of the segment are removed to avoid the boundary effect. FIG. 5B shows, respectively, the ratios of REQin vs. RESout, REQout vs. RESin and REQin vs. REQout over the same 5-minute time intervals. It can be seen that overall the total numbers of request and response messages received and sent by the SIP server do not vary significantly. In particular, for every one request message received/sent by the SIP server, on the average there is approximately one response message sent/received by it—this is generally to be expected. There are roughly twice as many request messages received by the SIP server than sent by it. This is primarily due to the REGISTER messages which comprise a large portion of the total request messages received by the SIP server. Unlike many SIP request messages of other methods (e.g., INVITE, SUBSCRIBE, a REGISTER request message does not trigger the SIP server to generate another request message except a response message. The SIP request messages may be broken down based on the method type and count their numbers over 5-minute time intervals. FIG. 5C shows the proportions of request messages of each method type received by the SIP server. FIG. 5D shows the proportions of request messages of each method type sent by the SIP server. It can be seen in FIG. 5C, REGISTER request messages consist of nearly 60% of the total request messages received by the SIP server, while SUBSCRIBE request messages consist of 40% of them. In particular, there is no NOTIFY request messages received by the SIP server. In contrast, in FIG. 5D, the NOTIFY messages comprise of 90% of the total request messages sent by the SIP server, while there is no REGISTER request messages at all. More in-depth examination of the SUBSCRIBE messages received and NOTIFY messages sent by the SIP server reveals that there is approximately a one-to-one correspondence between the SUBSCRIBE messages received and NOTIFY sent: this is to be expected, as a SUBSCRIBE received by the SIP server would trigger one (and perhaps a few more) NOTIFY messages sent by the SIP server. In both the request messages received and sent by the SIP server, call-related SIP request messages such as INVITE, BYE and CANCEL consist of only a small portion of the total request messages received/sent by the server. FIG. 5E shows the user activity diversity (UAD) metric of the total SIP messages (both received and sent) by the SIP server over 5-minute time intervals, as well as those for SIP request messages received and sent separately. It can be seen that the UAD metrics are close to 1 over all 5-minute time intervals and they are fairly stable. This is primarily due to the periodic exchanges of the REGISTER, SUBSCRIBE and NOTIFY messages and their responses between the SIP server and users. Results show that the aggregate SIP traffic behavior is in general fairly stable and the aggregate statistics/features chosen in the profiling methodology provides a good summary of these stable characteristics. The same observations also hold true for server 2 (which handle a relatively smaller portion of SIP messages in trace segment 2) as well as for trace segment 3 (where server 2 handles a large portion of SIP messages while server 1 handles a relatively smaller portion of them).

Figure 6A:
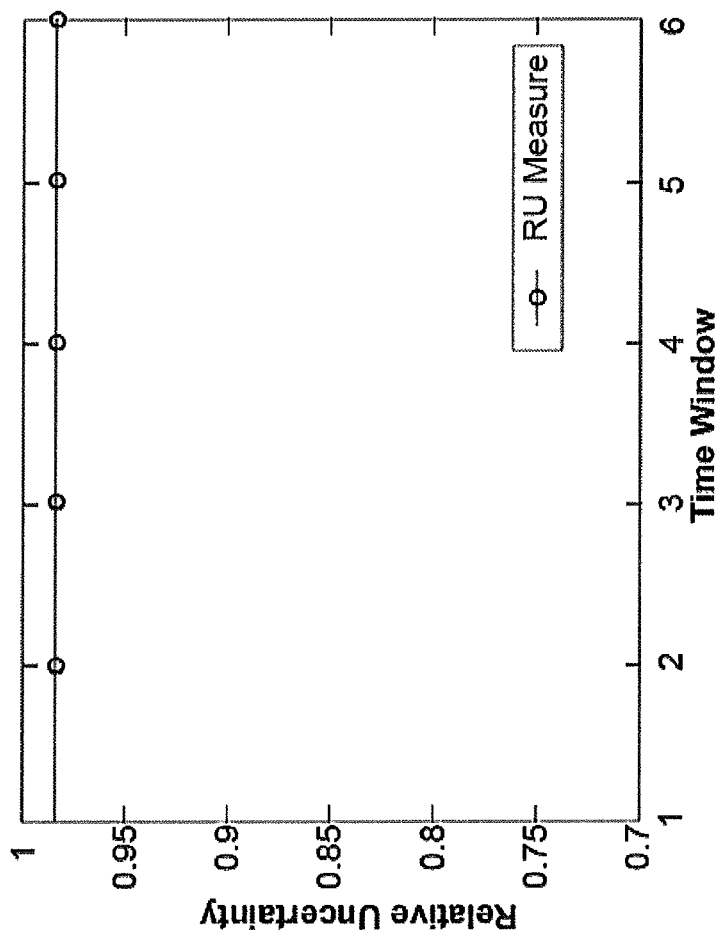
FIGS. 6A-6E illustrates an exemplary server entity level SIP network traffic behavior in normal operational environments.
Figure 6B:
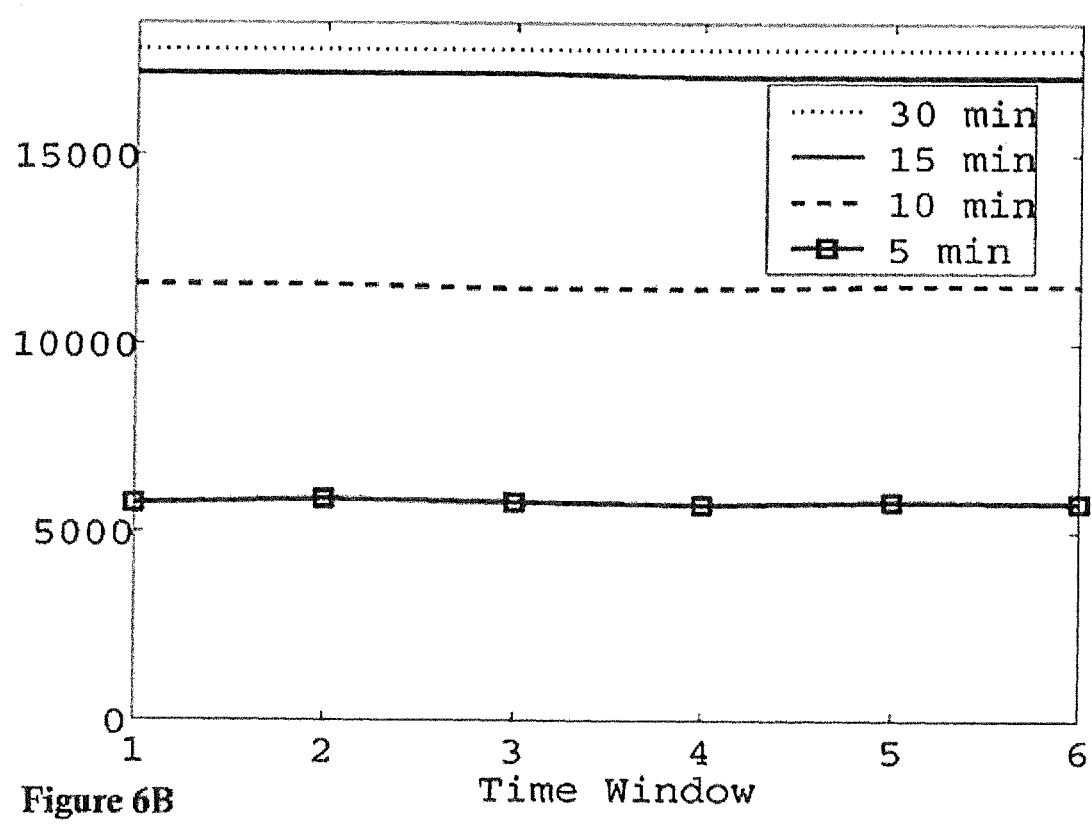
Figure 6C:
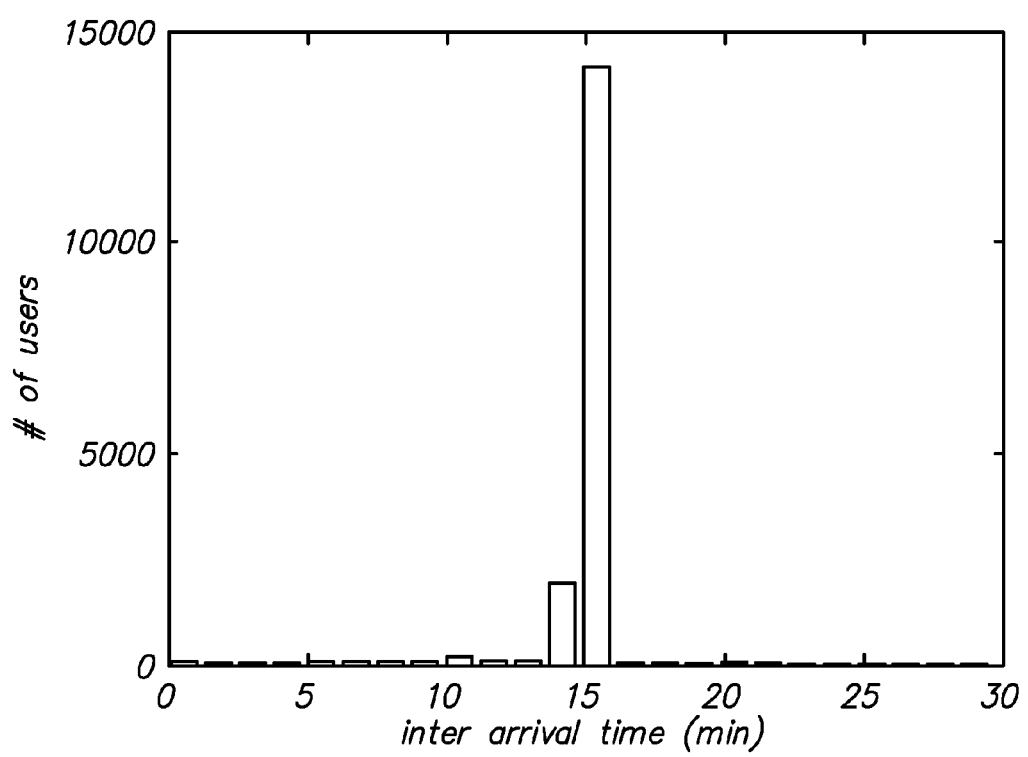
Figure 6D:
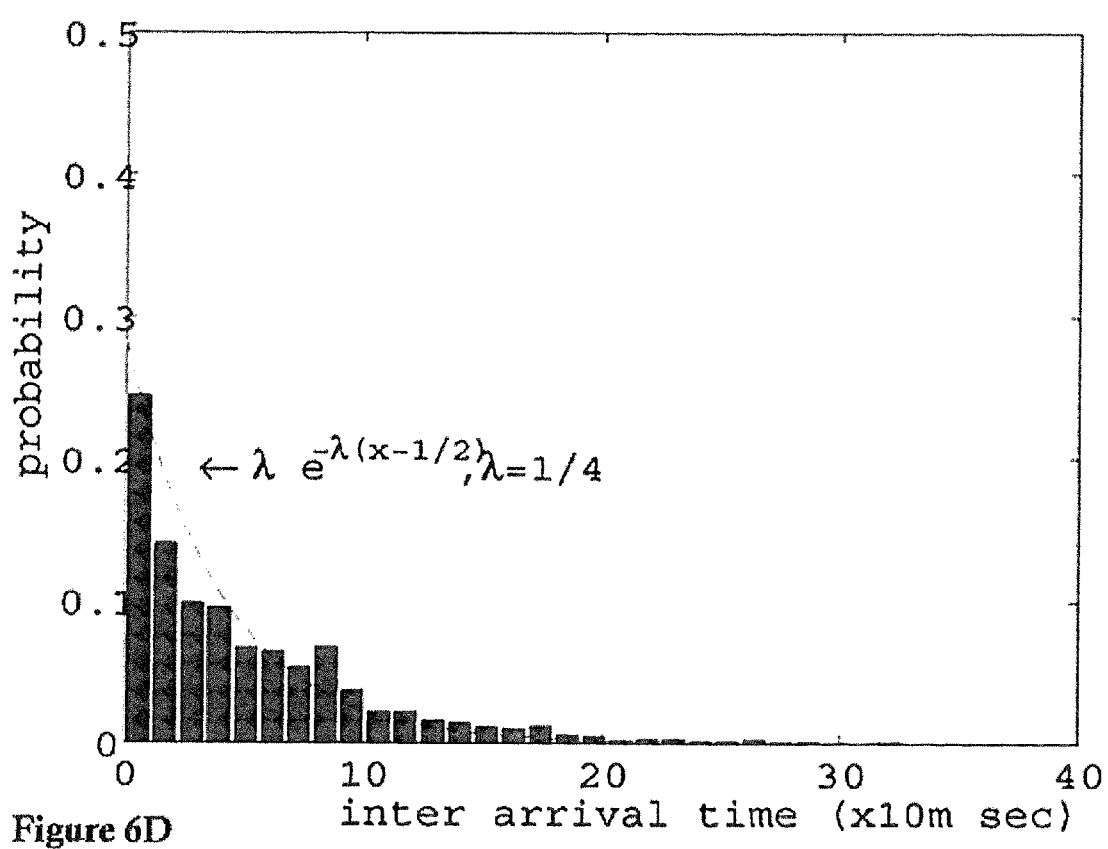
Figure 6E:
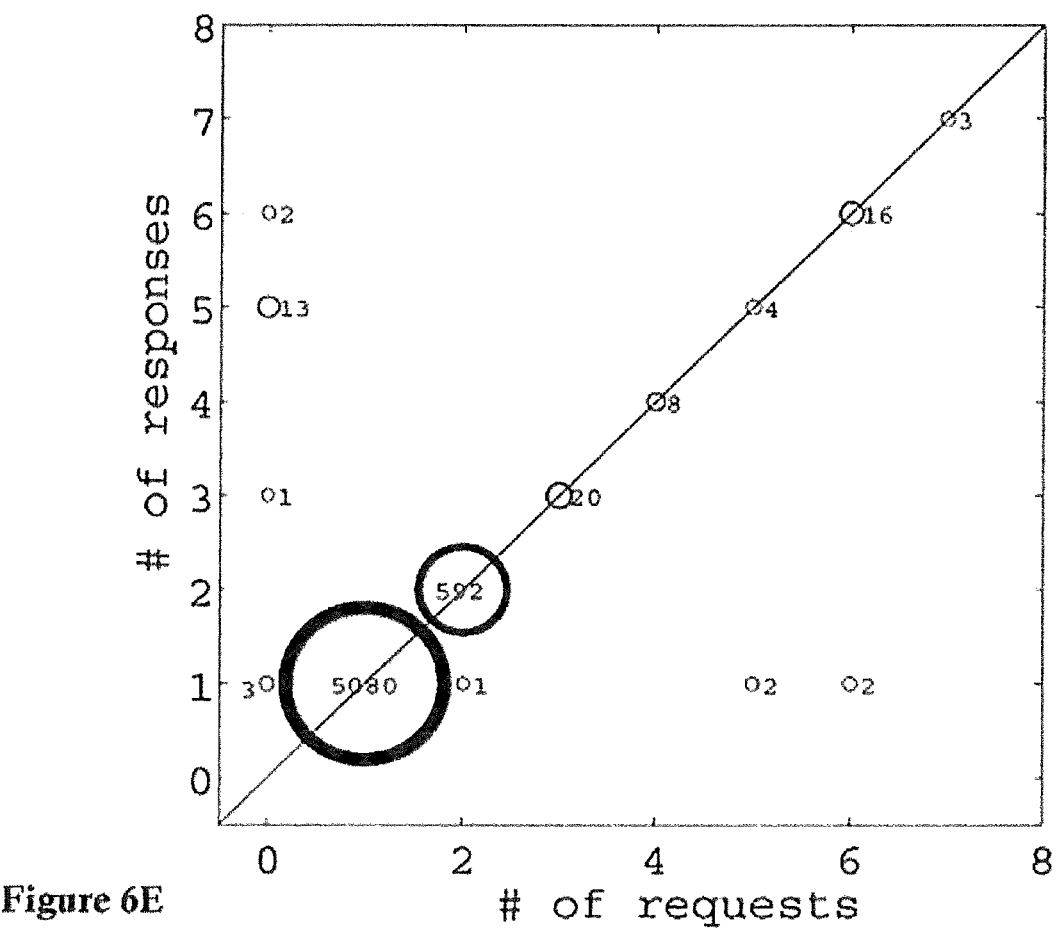
Figure 7A:
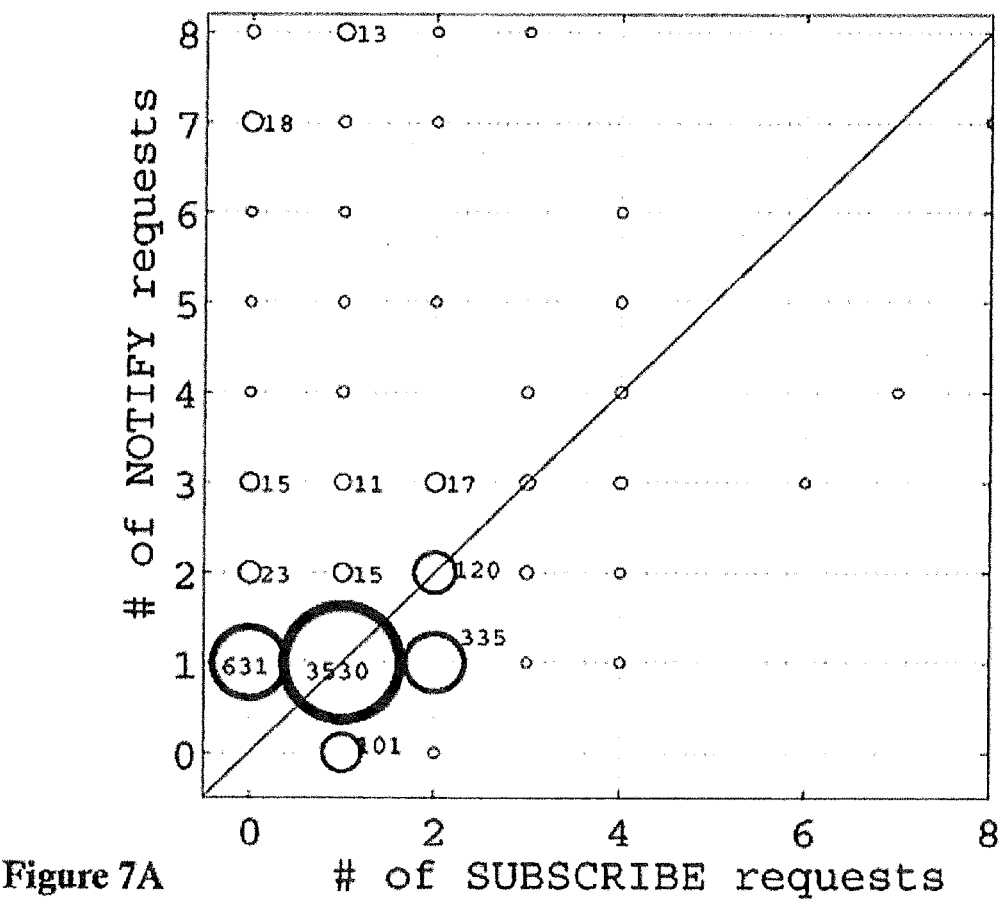
FIGS. 7A-7C illustrates another exemplary server entity level SIP network traffic behavior in normal operational environments.
Figure 7B:
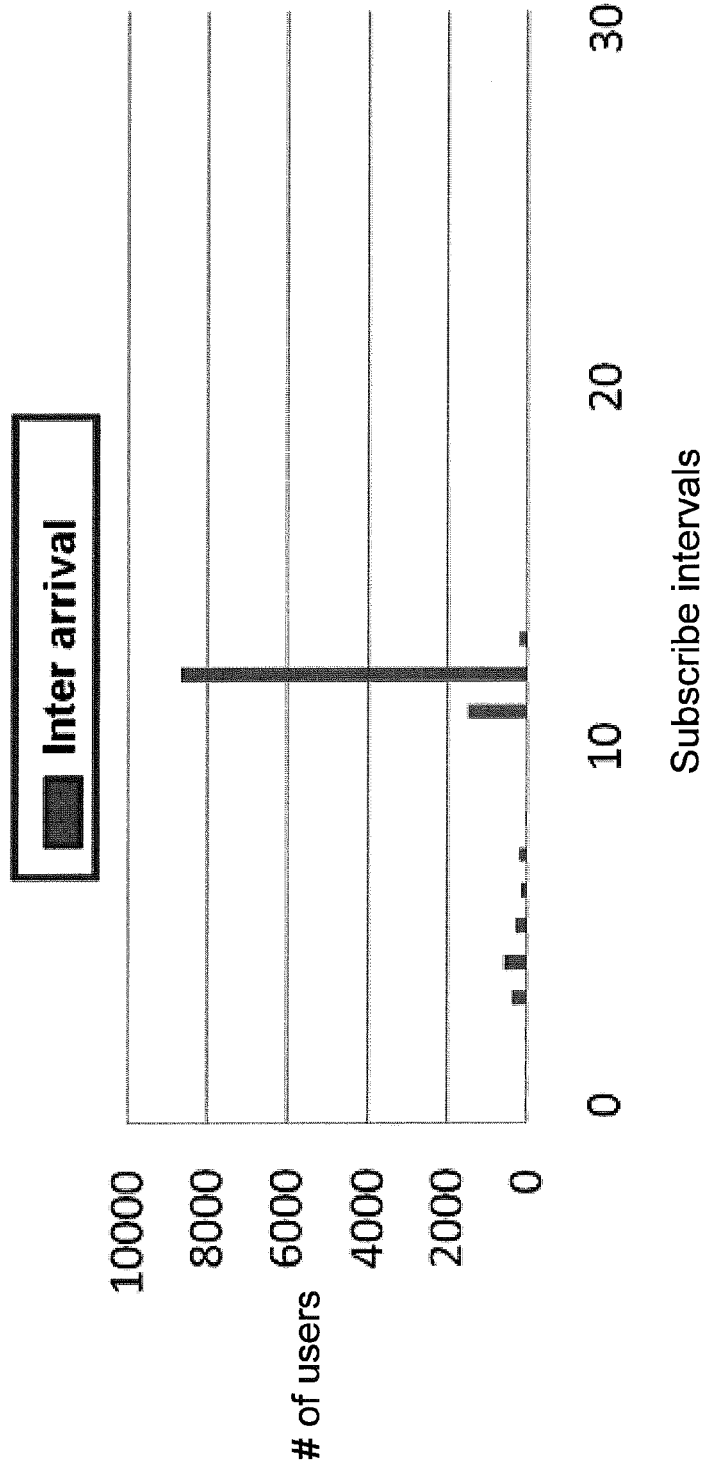
Figure 7C:
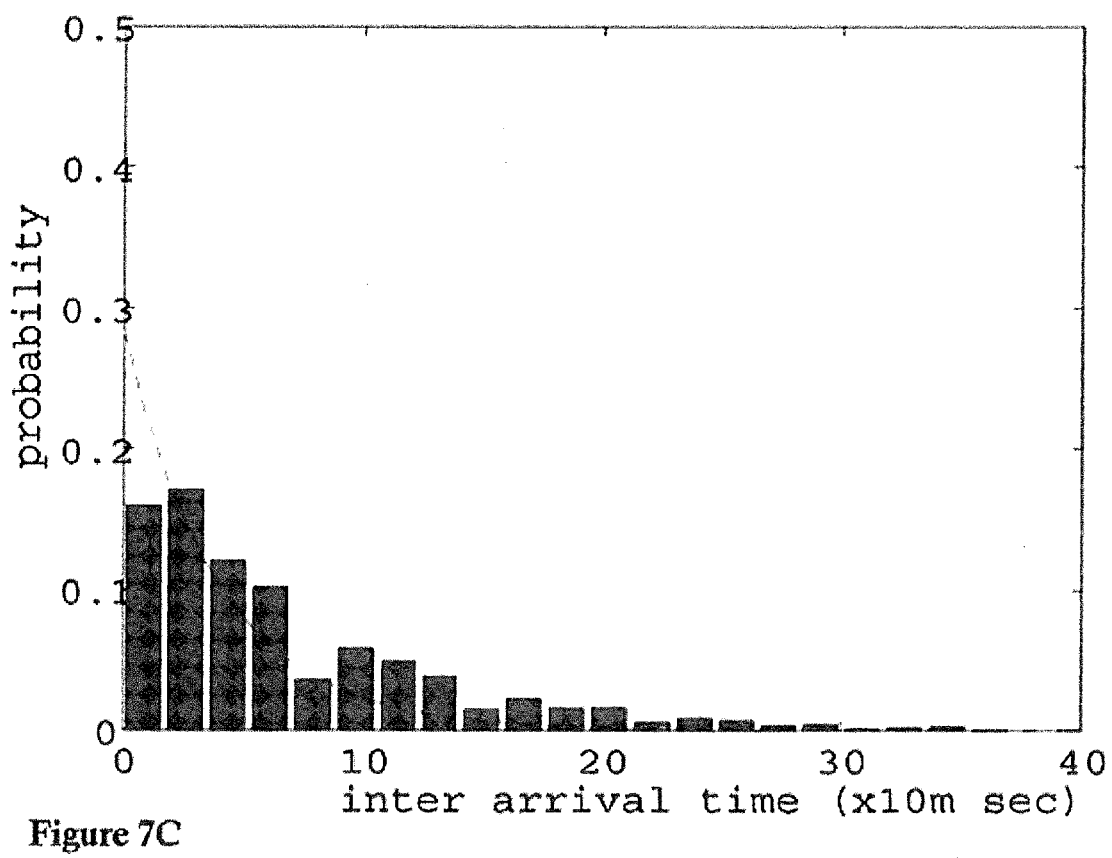

As another example, following the server entity level profiling 314, the REGISTER request messages and their responses of server 1 (functioning in the role of a registrar), and in particular, how REGISTER messages are generated by users may be examined. In FIG. 5C, it can be shown that REGISTER messages consist of 60% of the total request messages received by the SIP server (registrar). Moreover, the ratio of the number of REGISTER request messages vs. their responses is approximately 1. FIGS. 6A-6E illustrates an exemplary server entity level SIP network traffic behavior in normal operational environments. FIG. 6A shows that the user activity diversity metric for the REGISTER request messages is close to 1, indicating that there are no individual users who dominate the generation of REGISTER messages. In FIG. 6B, the number of unique users seen in the FROM field of the REGISTER messages is plotted over 5-minute time intervals as well as over 10- and 15-minute intervals. The total number of unique users seen in the entire segment of trace 2 is 17797, all of which are successfully registered. Hence on average there is one REGISTER message per user in each 15-minute interval. To further illustrate how REGISTER messages are generated, the time lapses between two consecutive REGISTER messages from each user may be calculated, the distribution of which is shown in FIG. 6C. The distribution clearly reveals that users generate REGISTER messages roughly periodically with a mean of 15 minutes. In FIG. 6D, the distribution of the inter-arrival times between two consecutive REGISTER messages from two different users is plotted. The distribution may be well fit into an exponential distribution of the form $p(x)=\lambda e^{-\lambda x}$, where $\lambda=0.27$. Hence it can be seen that the number of REGISTER messages seen by the SIP server registrar follows approximately a Poisson process, and the number of distinct users seen by the SIP server registrar in a time interval of length $T \leq 15$ min is roughly x times T. Hence it can be seen on the average around 6000 number of users in a 5-minute interval and around 12000 in a 10-minute interval, as shown in FIG. 6B. FIG. 6E is the scatter plot showing the number of REG- ISTER requests vs. the number of responses per user over 5-minute intervals. It can be seen that the majority of users send one REGISTER request every 5 minute while receiving one response. Several users receive more than several responses} back. In addition, a few users send up to 6 requests before getting one response back. This is likely due to possible registration failures, as the responses typically contain 4xx response code such as xxx and xxx. Following up on these failed user registration attempts, it is found that these users are eventually able to successfully register by re-sending REGISTER requests in a later time (typically after 15 minutes) that results in a successful response with the response code "200 OK". FIGS. 7A-7C illustrates another exemplary server entity level SIP network traffic behavior in normal operational environments. As shown earlier, SUBSCRIBE messages from users constitute nearly 40% requests received by the SIP server, and NOTIFY messages about 90% of request messages sent by the SIP server. Each SUBSCRIBE message from a user is followed by one or more NOTIFY messages from the SIP server to the same user (see FIG. 7A for the scatter plot showing the number of SUBSCRIBE messages sent vs. NOTIFY messages received per user in 5-minute intervals). FIG. 7B shows the distribution of the time lapses between two consecutive SUBSCRIBE messages from each user, and FIG. 7C shows the distribution of the inter-arrival times of two consecutive SUBSCRIBE messages from any users. These distributions are very similar to those of the REGISTER messages. The SUBSCRIBE messages are sent periodically by users and often follow the REGISTER messages of the users. Although SUBSCRIBE can be used by users to subscribe to many possible events, some specific to other users (e.g., events related to on-going dialogs at the other calling parties), the large number of SUBSCRIBE messages and their regularity indicates that these SUBSCRIBE messages are sent by users to subscribe to some server/system resources such as voice mailboxes.

Figure 8:
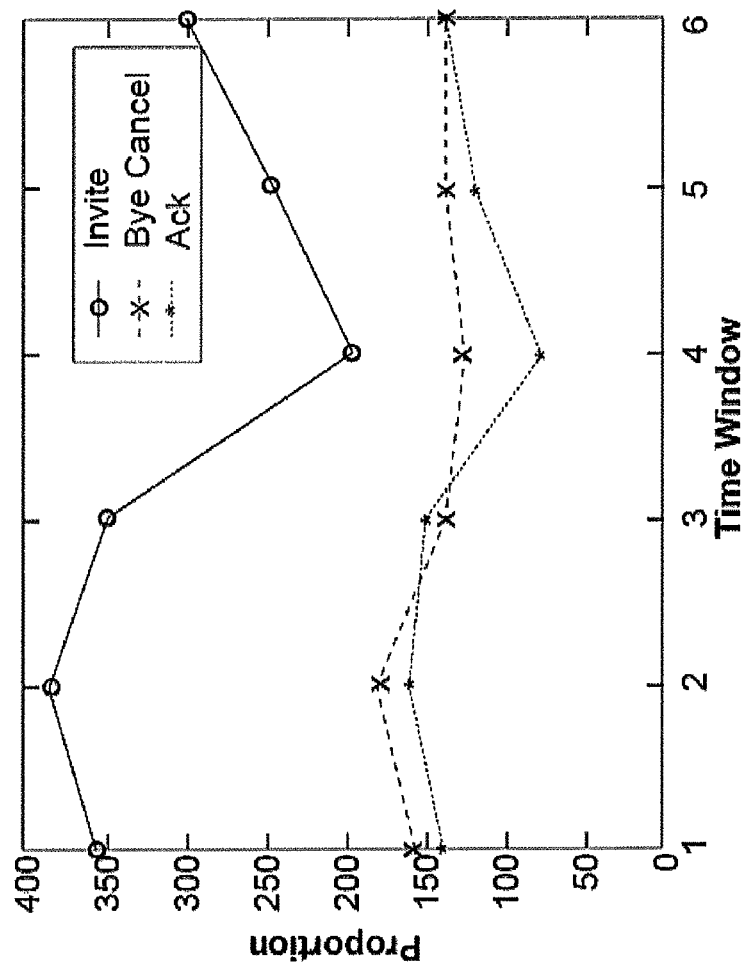
FIG. 8 illustrates yet another exemplary server entity level SIP network traffic behavior in normal operational environments.
Figure 9A:
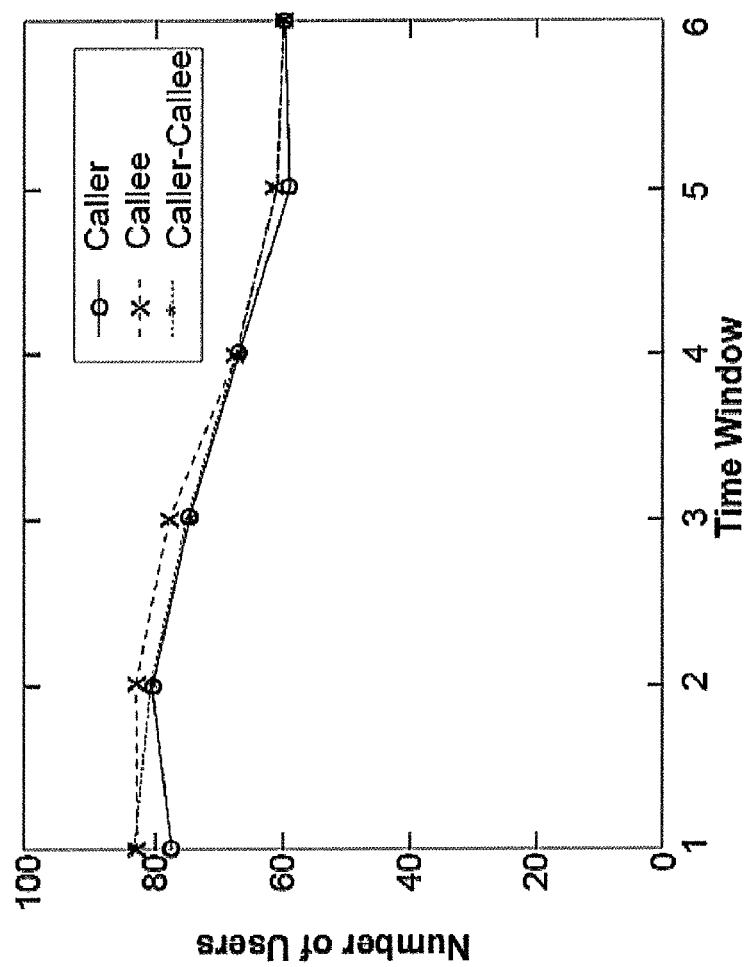
FIGS. 9A-9C illustrates still another exemplary server entity level SIP network traffic behavior in normal operational environments.
Figure 9B:
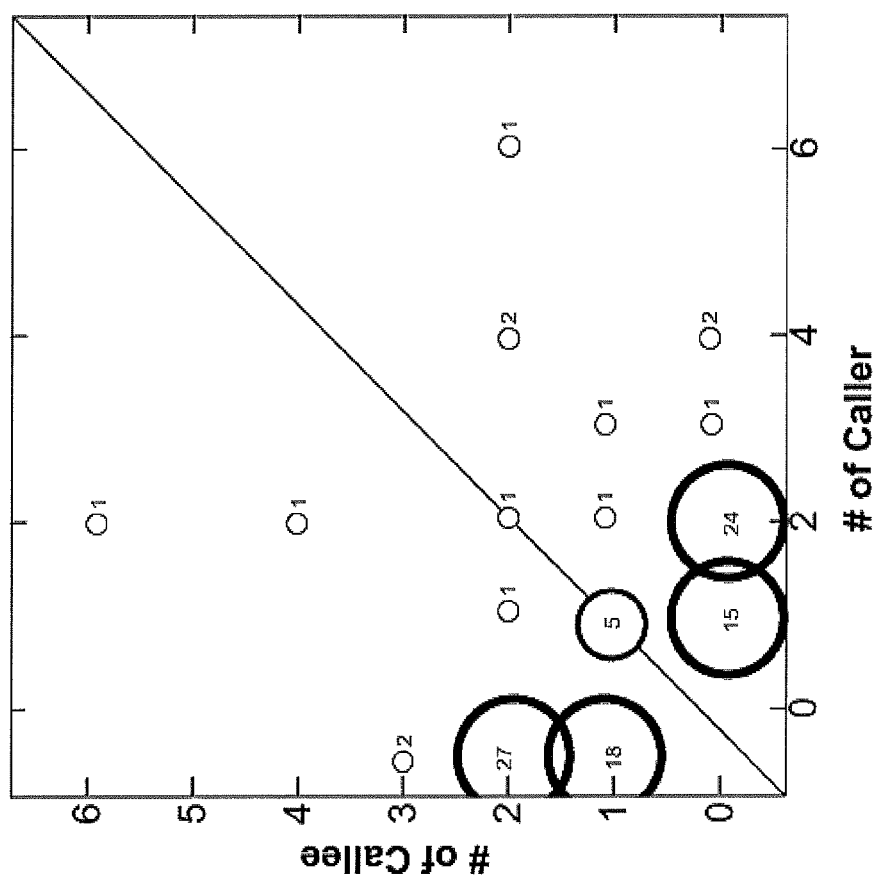
Figure 9C:
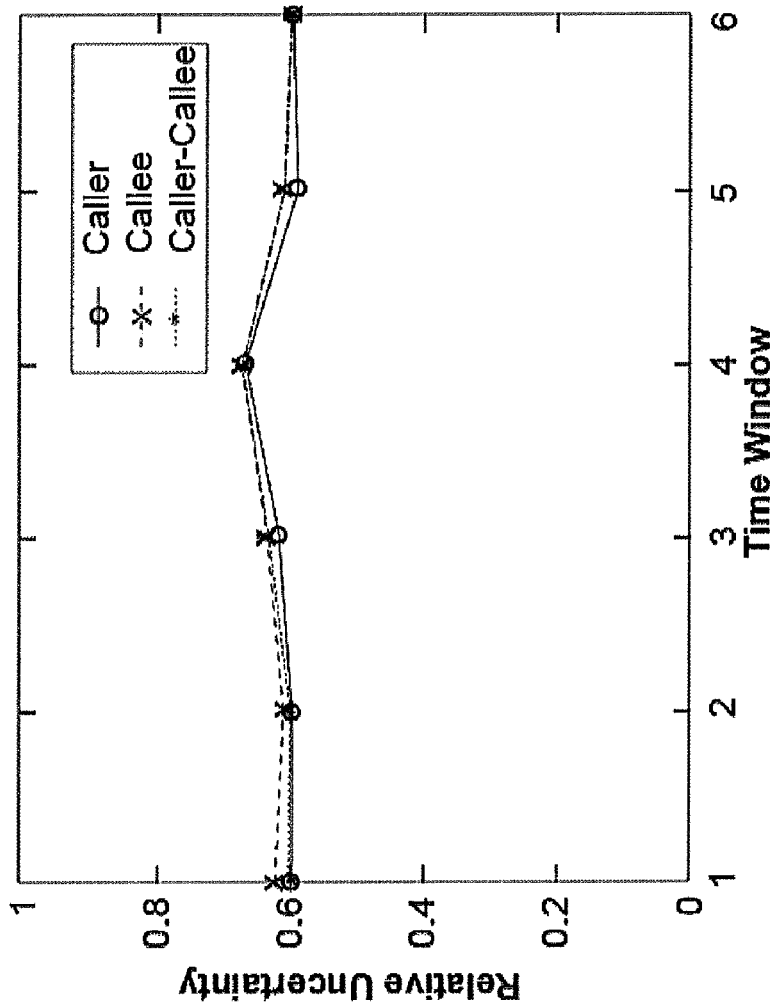
Figure 10A:
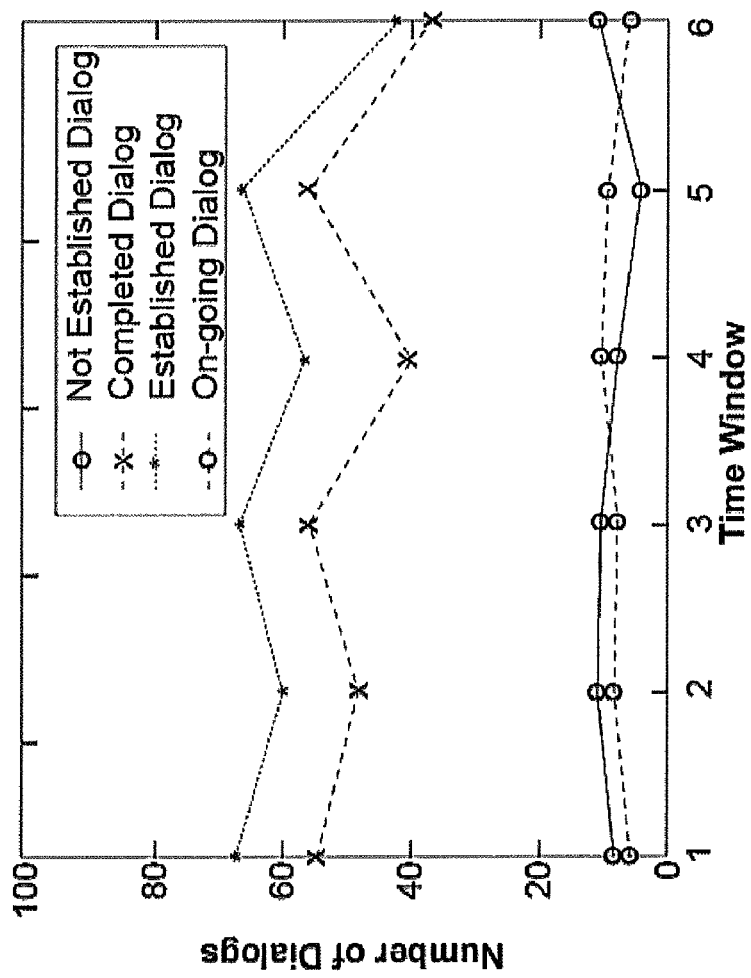
FIGS. 10A-10C illustrates still another exemplary server entity level SIP network traffic behavior in normal operational environments.
Figure 10B:
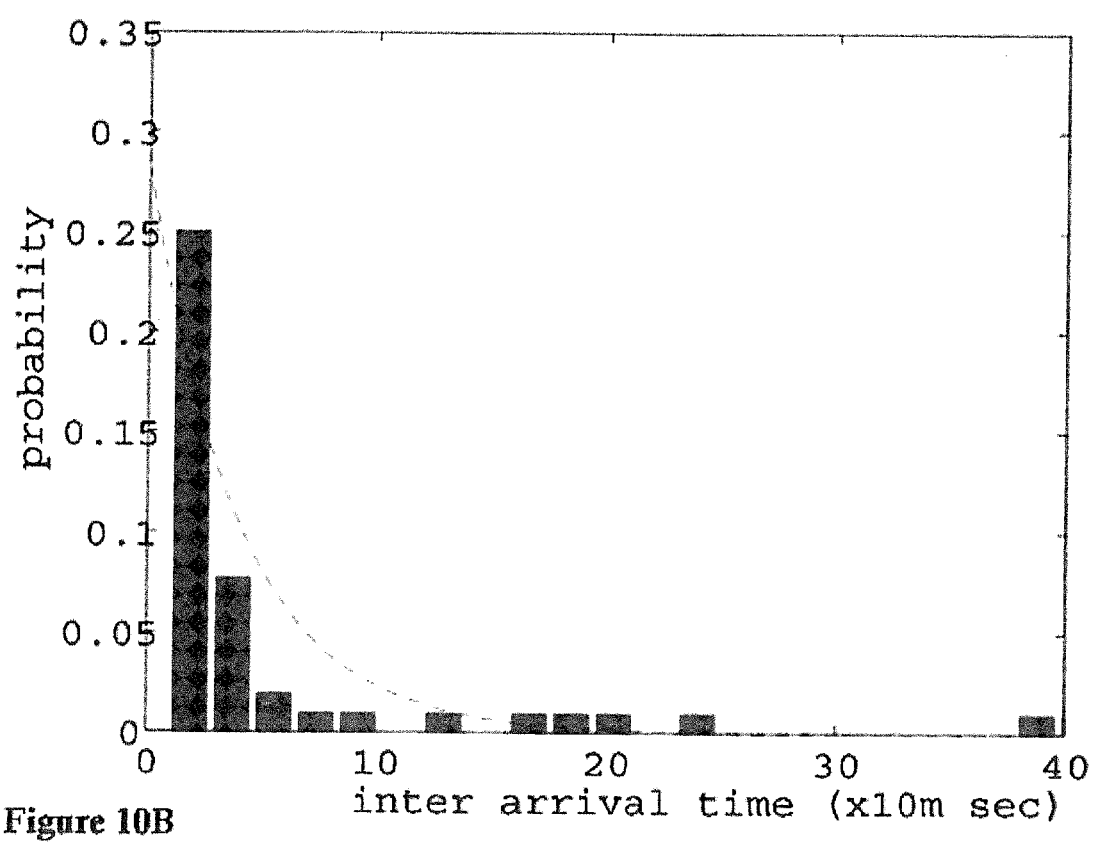
Figure 10C:
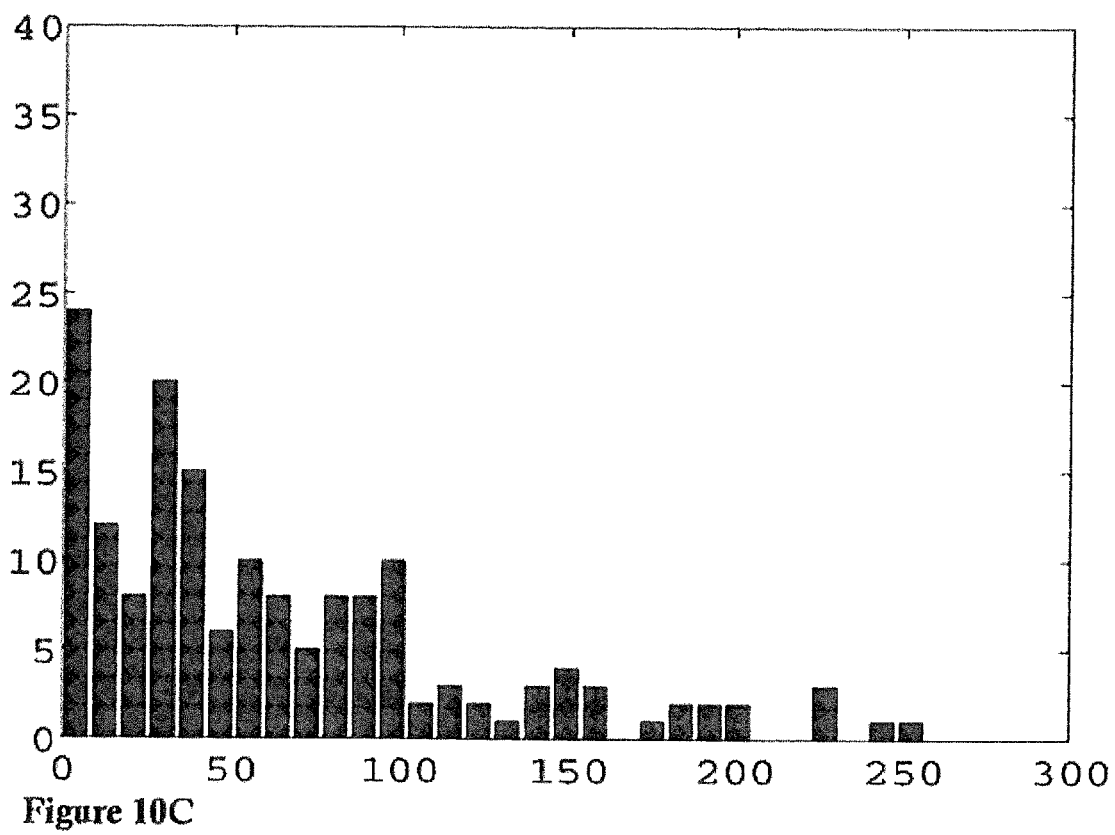

As still another example, following the server entity level profiling 315, call proxy and user call behavior characteristics may be analyzed. FIGS. 8 and 9A-9C illustrates still another exemplary server entity level SIP network traffic behavior in normal operational environments. FIG. 8 shows the numbers of various call-related SIP request messages such as INVITE, BYE, CANCEL and ACK sent/received by the SIP server functioning as a call proxy over 5-minute intervals. Comparing with the number of REGISTER, SUBSCRIBE and NOTIFY messages, call-related messages consist of a much smaller portion, indicating that while there are a large number of users (or, SIP phone devices) in the network, only a very small number of the users actually make phone calls in each 5-minute period. This observation is further confirmed in FIG. 9A which shows the number of unique callers (users seen in the FROM field of INVITE messages) and callees (users seen in the TO field). Recall that there is a total of 17797 unique users in the trace segment. FIG. 9B is a scatter plot showing the number of calls made vs. calls received per user over 5-minute intervals. Again it can be seen that at individual user level, the numbers of calls made and received are generally very small and consistent. In terms of diversity of calls made by users, FIG. 9C shows the UAD metrics of callers (FROM's), callees (TO's) and caller-callee pairs (FROM-TO's) as defined above. It can be seen that the call activities are fairly random, not dominated by any particular user either as caller or callee. FIGS. 10A-10C illustrates still another exemplary server entity level SIP network traffic behavior in normal operational environments. The number of various call types (on-going, completed, not-established (i.e., failed or canceled)) over 5-minute intervals is shown in FIG. 10A. FIG. 10B shows the distribution of call inter-arrival times, and FIG. 10C shows the duration of completed calls (and cancelled calls). It can be seen that the number of calls in a typical 5-minute interval is fairly small, and the call arrival process is approximately Poisson with approximately exponentially distributed call inter-arrival times. Call duration typically lasts between 1-3 minutes, while canceled calls tend to very short. These statistics are similar to traditional telephony, indicating that these call activities are human-generated.

Figure 11A:
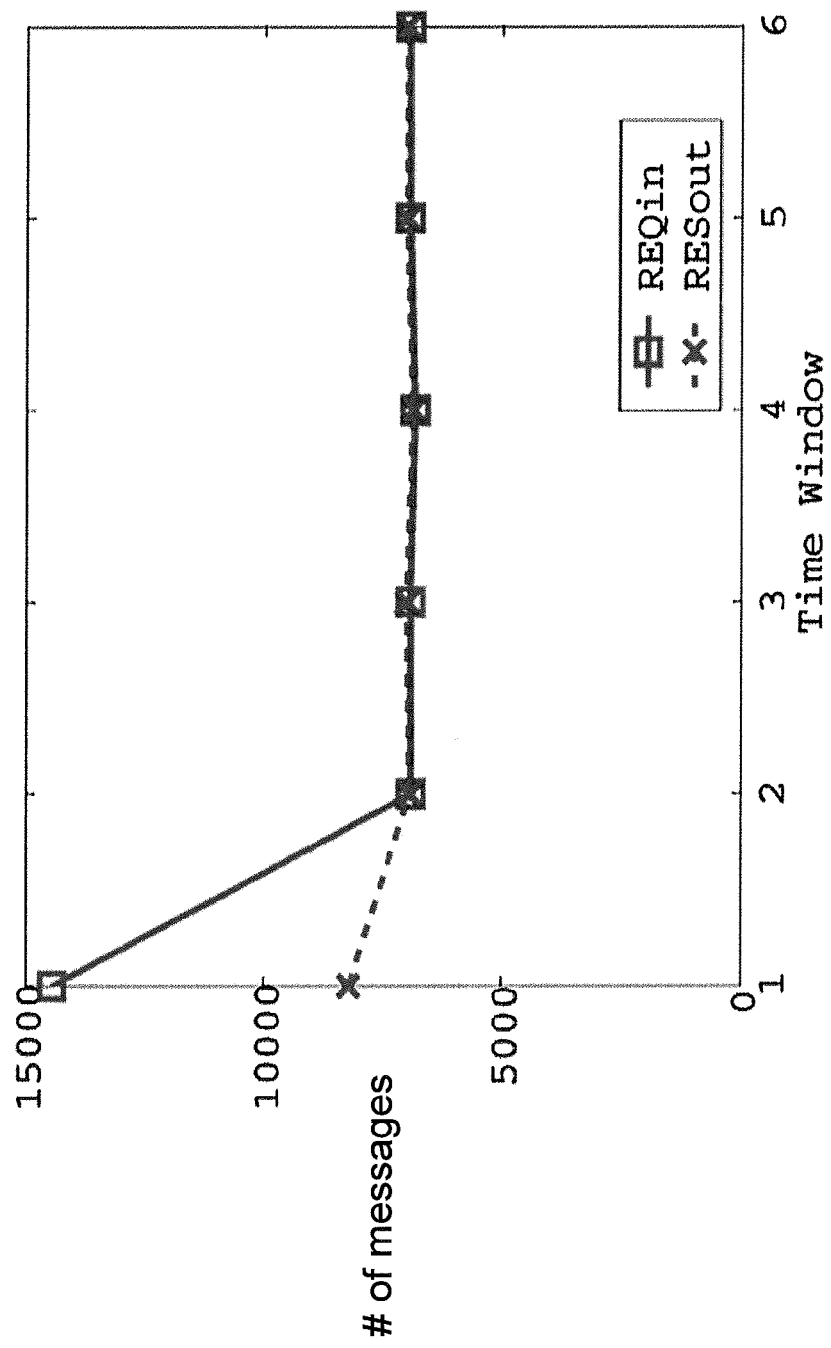
FIGS. 11A-11C illustrates an exemplary SIP network traffic anomaly.
Figure 11B:
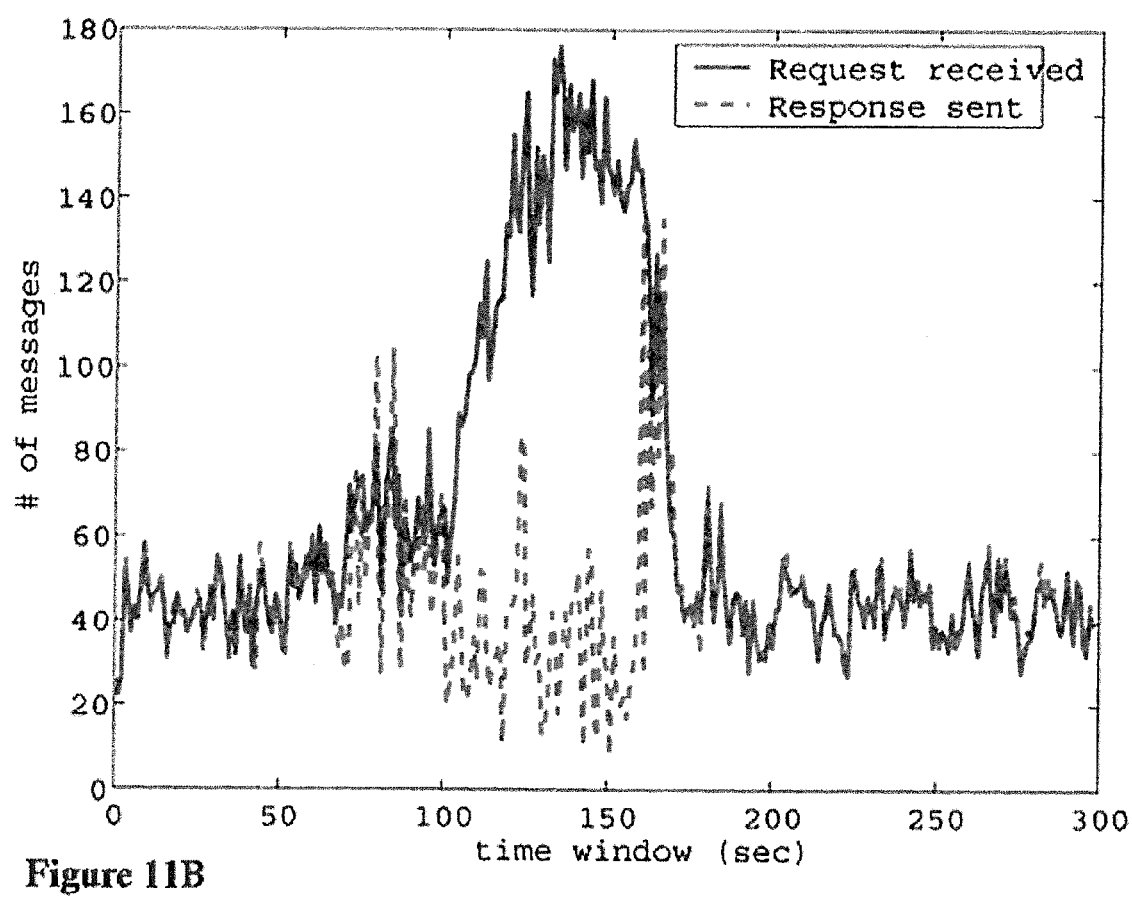
Figure 11C:
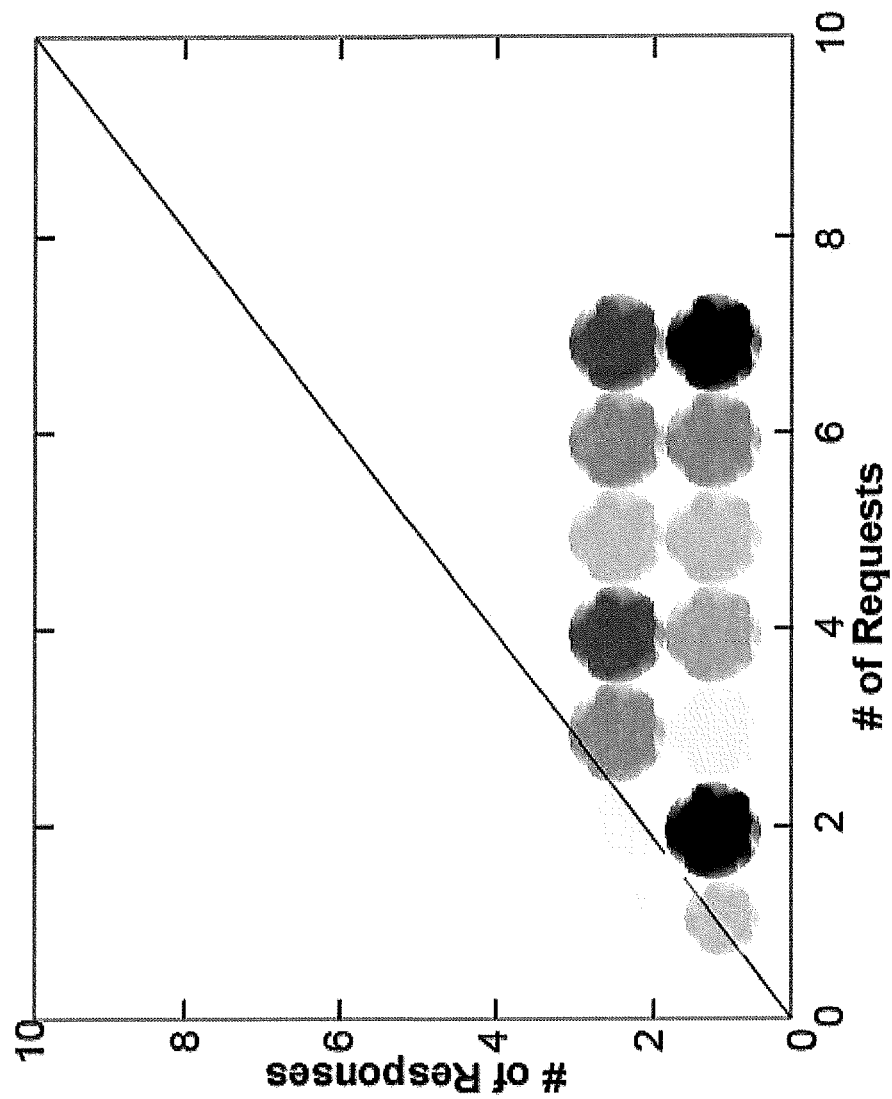

The exemplary general profiling methodology presented above may be used to identify anomalies that may be caused by performance problems or implementation flaws in a VoIP service or the underlying network. A case study may be used to illustrate the efficacy—a case uncovered in the analysis of the SIP traces from an operational VoIP network. FIGS. 11A-11C illustrates an exemplary SIP network traffic anomaly. As described above, it can be seen that overall the numbers of SIP REGISTER request and response messages and their ratios (over 5-minute intervals) stay fairly stable, and this can be mainly attributed to the fact that users generate REGISTER messages periodically and these messages are generated randomly from the users. These observations hold almost all 5-minute intervals for both servers in the traces except for one 5-minute interval of server 1 in trace segment 1, where an anomaly is found. As evident in FIG. 11A, the number of REGISTER messages received by server 1 (REQin) in the very first 5-minute interval in this trace segment is significantly larger than in other time intervals, and while the number of the responses sent by the server also increases slightly—in particular, the ratio of the numbers of requests vs. responses increases drastically. To figure out what caused this anomaly, an in-depth analysis may be performed of the SIP messages in this anomalous 5-minute interval. FIG. 11B shows the number of REGISTER messages received by server 1 vs. the responses generated by it in each second of the anomalous 5-minute interval. It can be seen that between around the 100th second to 160th second of this 5-minute interval, the number of REGISTER requests from users shots up quickly, while the responses returned by the server first dips for about 50-60 seconds before it shots up also, catching up with the number of REGISTER requests, after which everything returns to the norm. FIG. 11C is a scatter showing the number of REGISTER requests generated vs. number of responses received per user in the 1-minute time period from the 100th second to 160th second. To better illustrate the number of data points occupying a particular integer-valued grid (x, y); the data points may be perturbed slightly around it at random. It can be seen that instead of the normal one REGISTER request and one response per user, many users send from 2-7 REGISTER requests while receiving one or two responses. Closer investigation may reveal that the problem is caused by the SIP server not responding to the user registration requests immediately, which triggers the users to repeatedly re-transmit the requests in a short time span (within a few seconds) until it either gives up or receives a response back—either with response code 404 (Not Found) or 408 (Request Timeout) or eventually with response code 200 (OK). Since all these users were eventually able to successfully register with the SIP server, the surge of the REGISTER requests is unlikely caused by some kind of denial-of-service attacks with spoofed or frivolous REGISTER messages. That the SIP server failed to respond to the user registration requests in a timely fashion may be caused by delay or slow response from some remote (user/call) database with which the SIP server was interacting. This problem points to a implementation flaw in the SIP client software: when a registration request times out, the client immediately retransmits the request, thereby causing a surge of requests and thus making the problem worse. A better implementation solution would have been to use an exponential back-off mechanism to handle the retransmission of the registration requests. This SIP traffic anomaly found in this case study may be easily detected using the general profiling methodology described above: by tracking the number of REGISTER messages and the ratio of REGISTER messages and their responses over time (e.g., via an exponential averaging), a simple threshold-based change detection mechanism may be applied to detect the anomaly.

Figure 12:
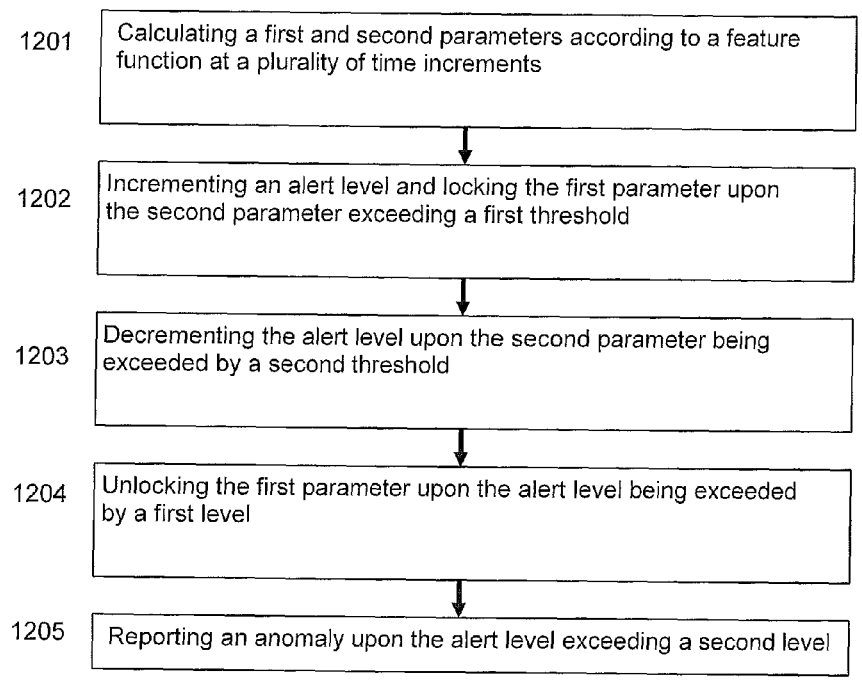
FIG. 12 illustrates a flow chart for detecting SIP network traffic anomaly.

FIG. 12 illustrates a flow chart for detecting SIP network traffic anomaly. Here, a first and second parameters are calculated according to a feature function at a plurality of time increments (1201). At one or more of the plurality of time increments, an alert level is incremented and the first parameter is locked upon the second parameter exceeding a first threshold (1202). At one or more of the plurality of time increments, the alert level is decremented upon the second parameter being exceeded by a second threshold (1203). The first parameter is unlocked upon the alert level being exceeded by a first level (1204). Then an anomaly is reported upon the alert level exceeding a second level (1205). As an example, an ensemble of statistics and features may be produced over time: for each statistics/feature, a time series is generated. Sudden changes or deviations from expected behavior in one or a subset of the statistics/feature time series may signify anomalies. Different VoIP attacks may trigger a different set or subset of statistics/features to exhibit sudden changes or deviant behaviors.

Figure 13:
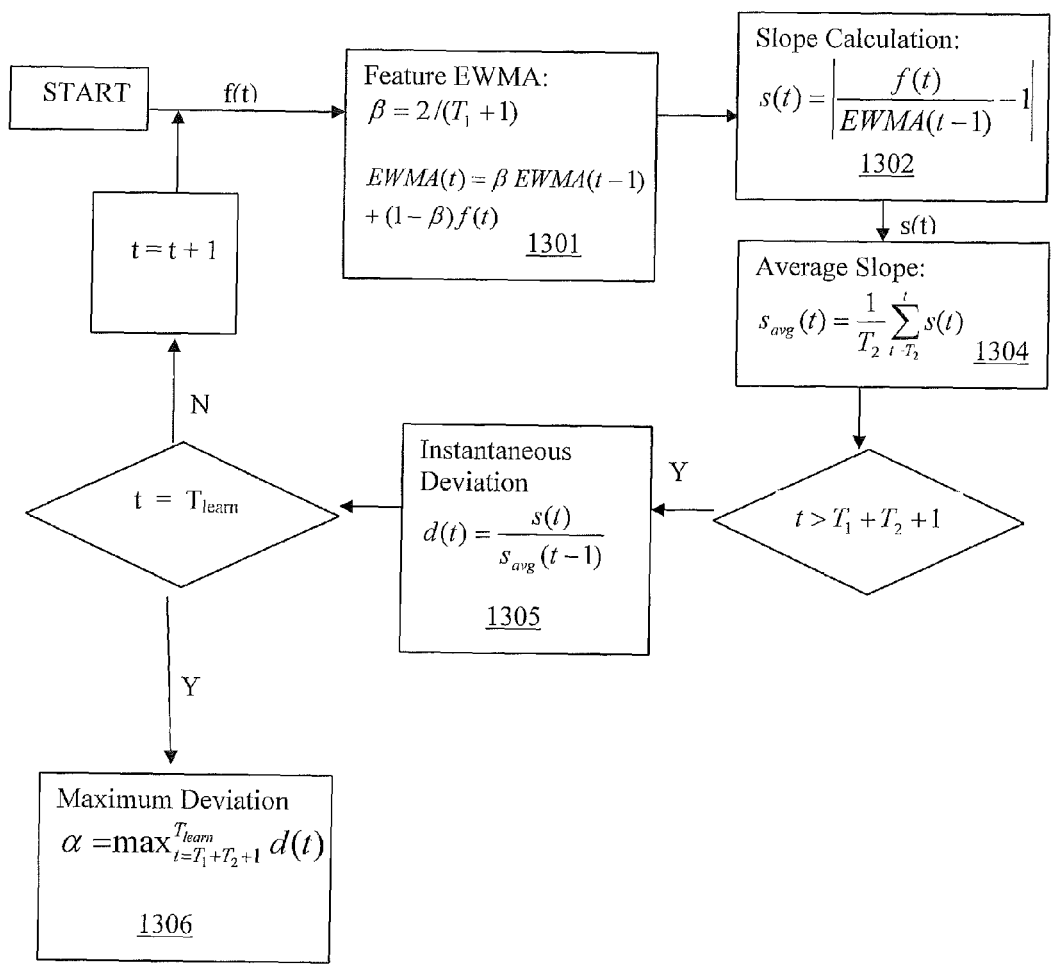
FIG. 13 illustrates an aspect of an exemplary algorithm for detecting SIP network traffic anomaly.

FIG. 13 illustrates an exemplary algorithm of the process 1201 for detecting SIP network traffic anomaly. The exemplary algorithm is for base-lining a deviation during a learning period: inputs are feature values f(t) at time instants t∈[0–$T_{learn}$] and the following time windows: $T_1$, $T_2$ and $T_{learn}$, where $T_1+T_2<T_{learn}$. Output is a measure of maximum possible deviation: $\alpha$. Here, during a from time window [0–$T_{learn}$], a feature function is base-lined and an estimate of the maximum possible deviation is obtained under normal circumstances (1201). The average value of the feature function f, may be calculated over a sliding window $T_1$ where $T_1<T_{learn}$. As an example, Exponential Weighted Moving Average (EWMA) may be used with a $\beta=2/(T_1+1)$. The EWMA of a feature function at a time t may be calculated as: EWMA(t)=$\beta$ EWMA(t−1)+(1−$\beta$) f(t) (1301). Thus, the EWMA of the feature function may be the predicted value and a first parameter "slope" may be calculated as: s(t)=|f(t)/(EWMA(t))−1| (1302). Over another window $T_2$, where $T_1+T_2<T_{learn}$ the first parameter "slope" may be averaged such that for every time t in the period [$T_1+T_2<T_{learn}$], a average slope may be calculated as $s_{avg}(t)=1/T_2\Sigma^t_{t-T2}$ s(t) (1303). At a time t+1, an instantaneous deviation may be calculated as a second parameter from its average as: d(t+1)= s(t+1)/$s_{avg}$(t), or:

$$d(t) = \frac{s(t)}{s_{avg}(t-1)} \quad (1305)$$

The maximum of this deviation in the time period [($T_1+T_2+1)-T_{learn}$] may be calculated as a first threshold as:

$$\alpha = \max_{t=T_1+T_2+1}^{T_{learn}} d(t) \quad (1306)$$

Figure 14:
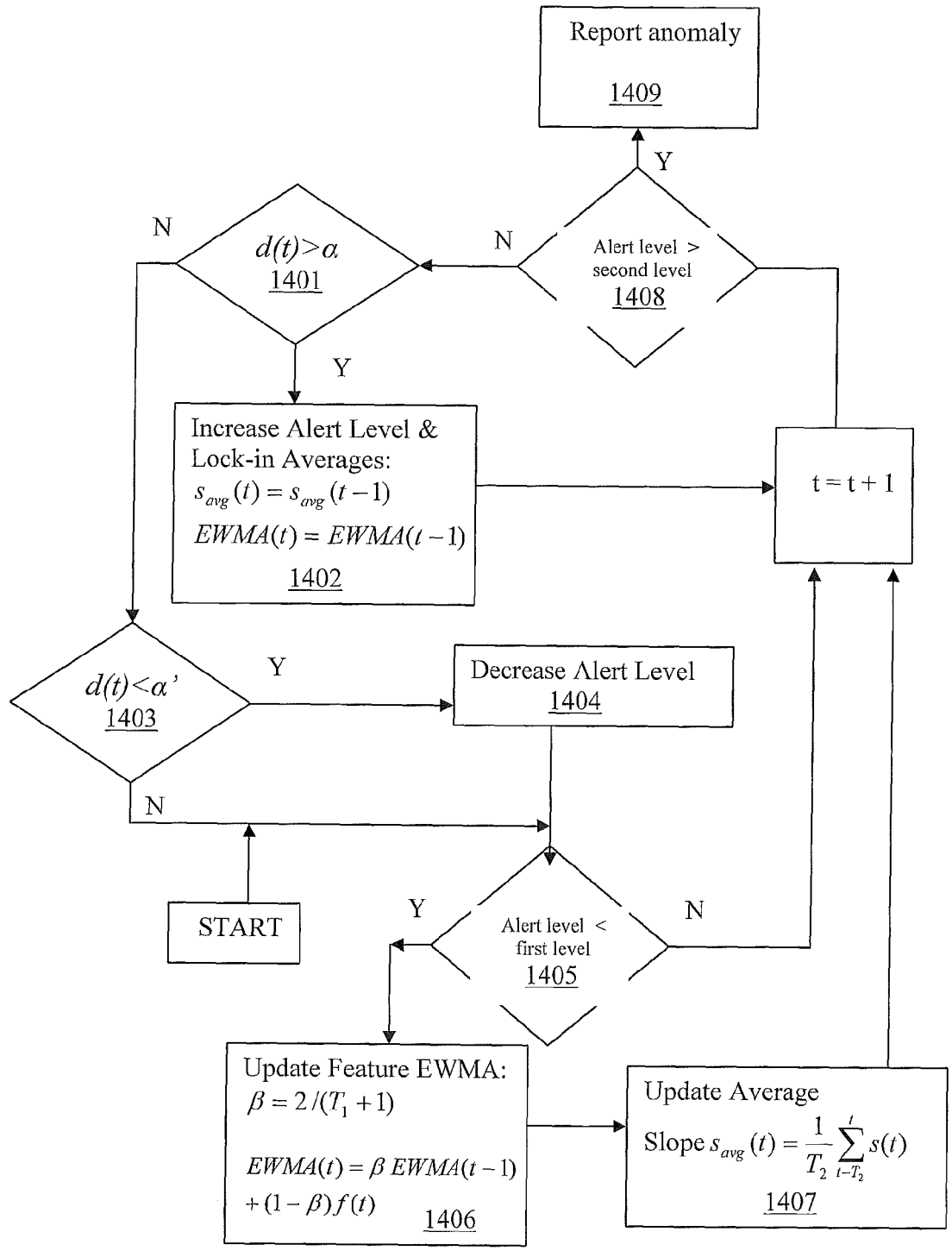
FIG. 14 illustrates another aspect of an exemplary algorithm for detecting SIP network traffic anomaly.
Figure 15A:
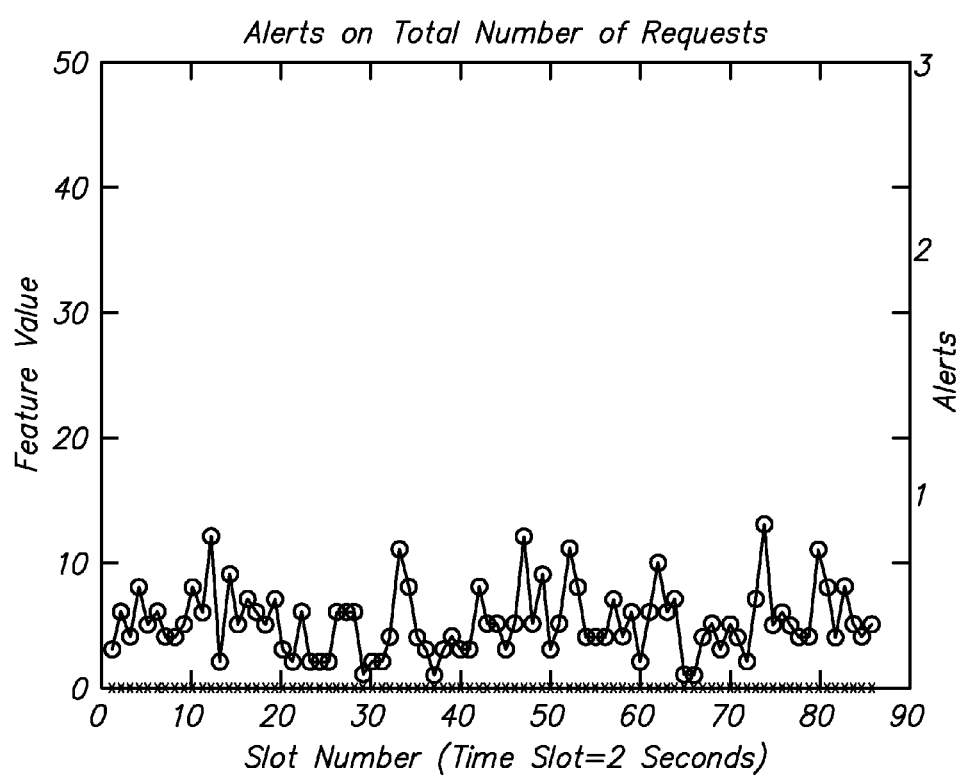
FIGS. 15A-15F illustrates an exemplary SIP network traffic behavior against an exemplary call spam attack.
Figure 15B:
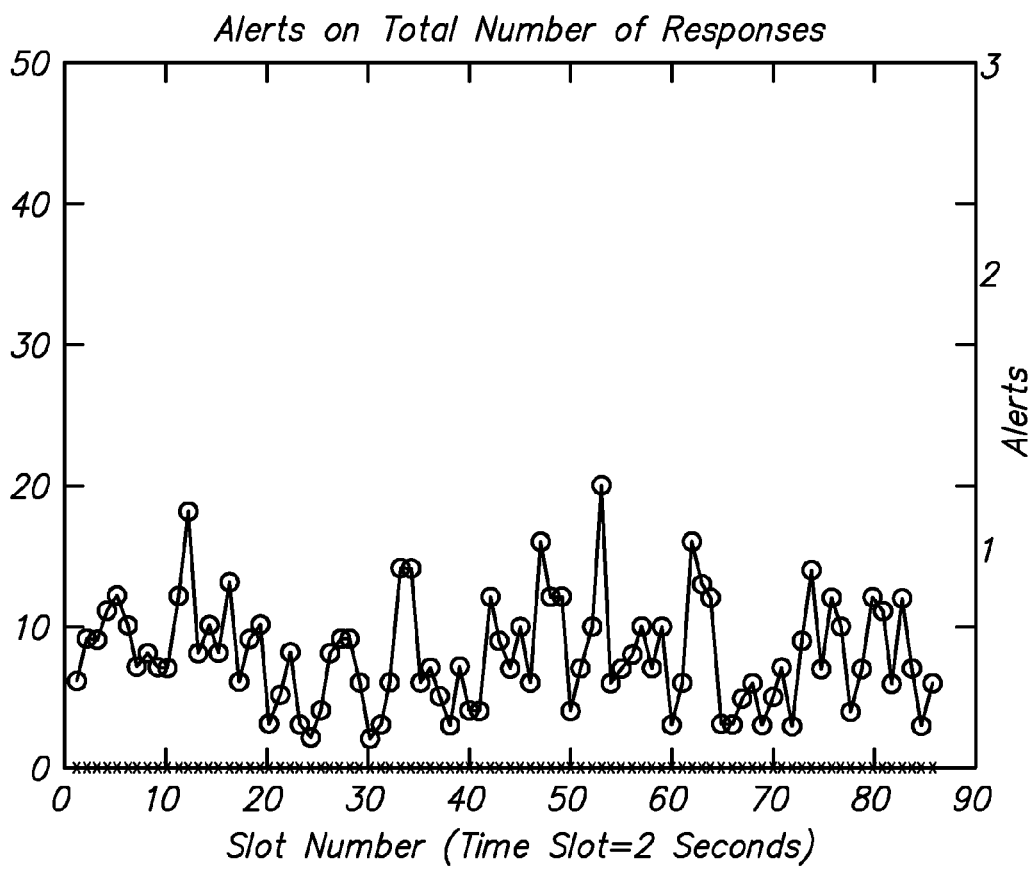
Figure 15C:
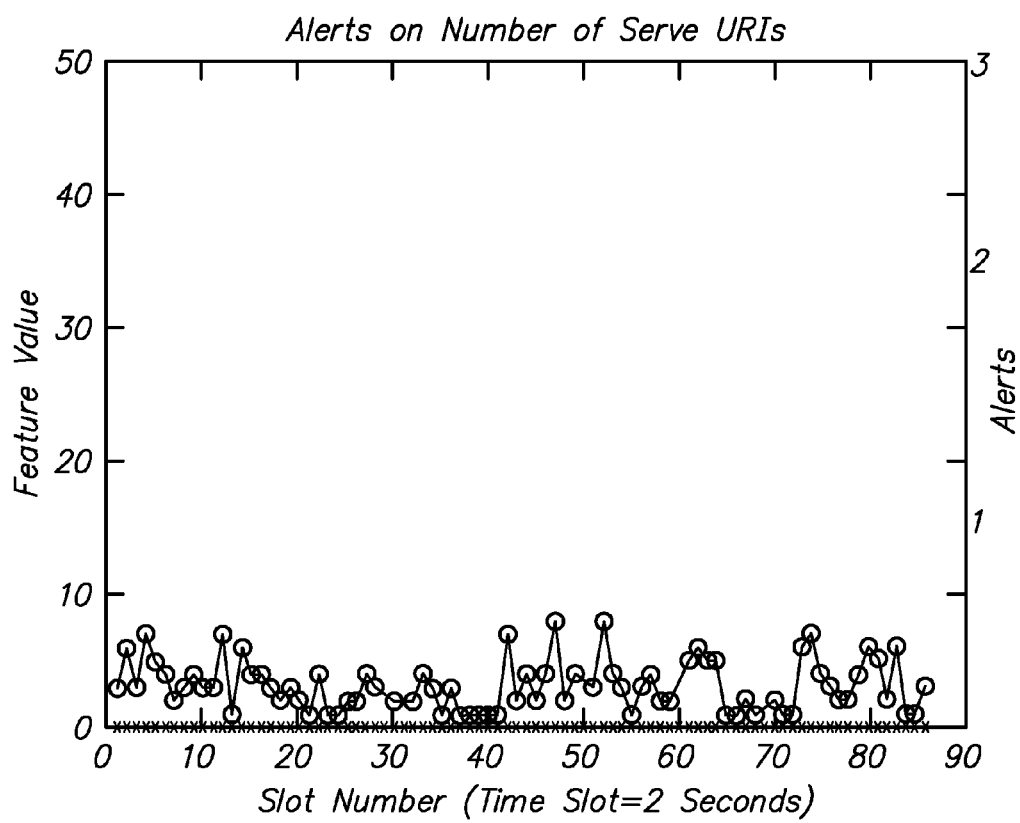
Figure 15D:
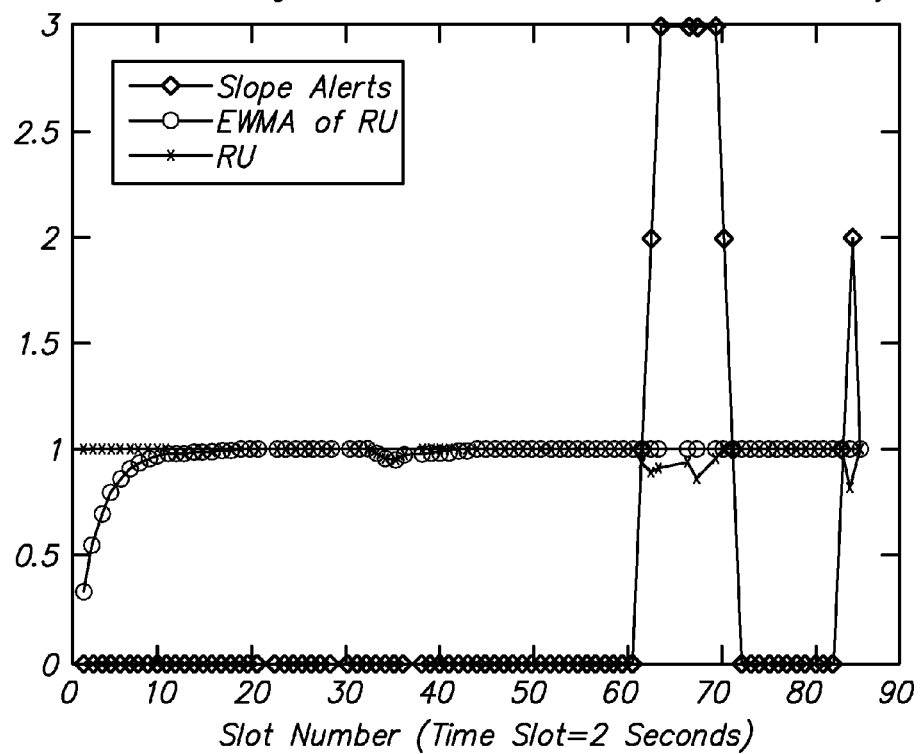
Figure 15E:
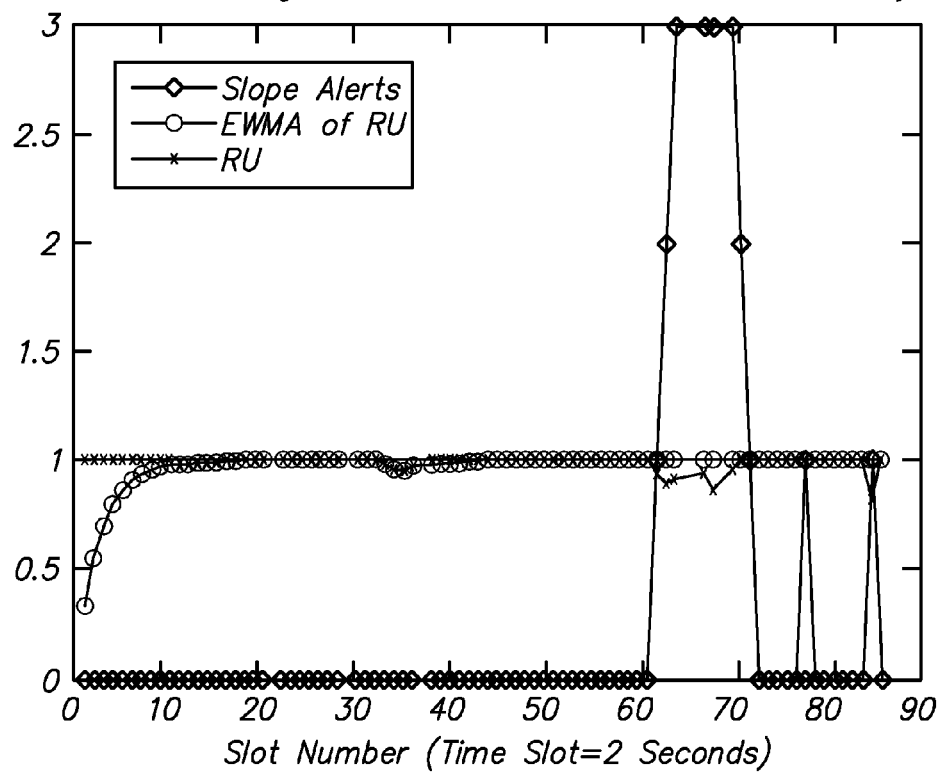
Figure 15F:
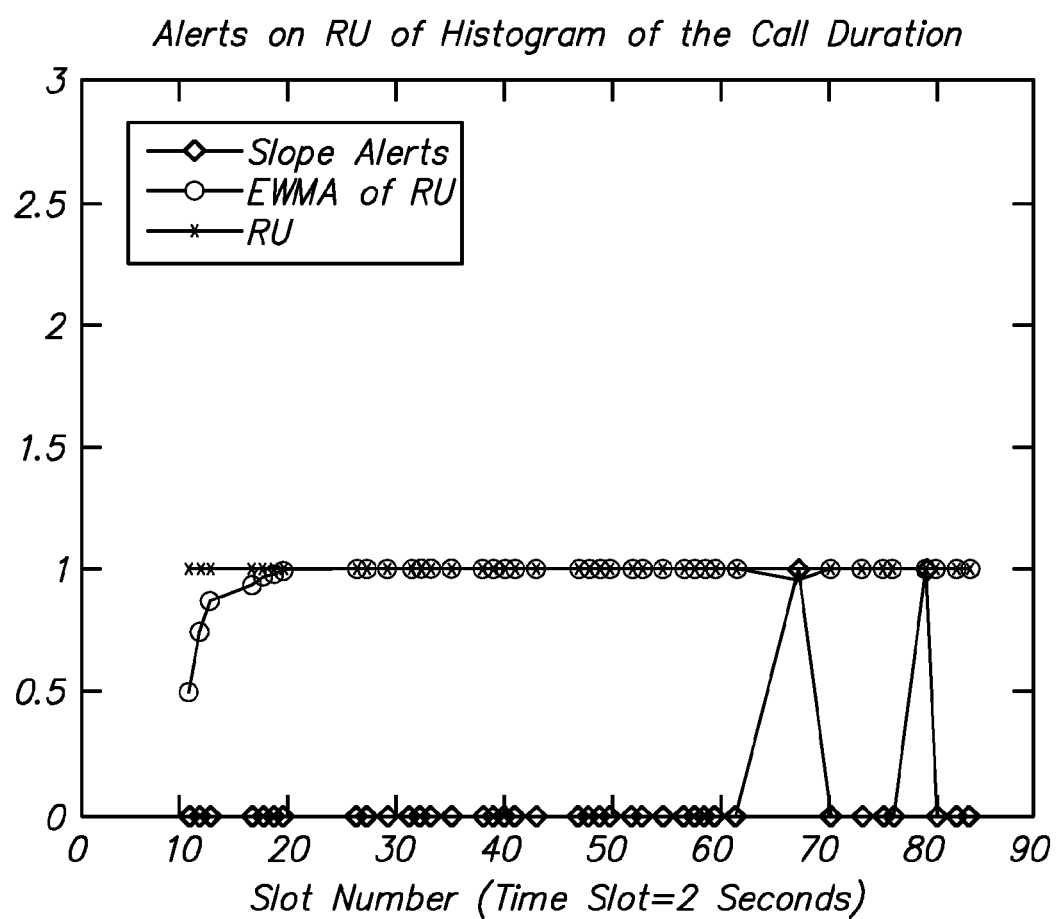
Figure 16A:
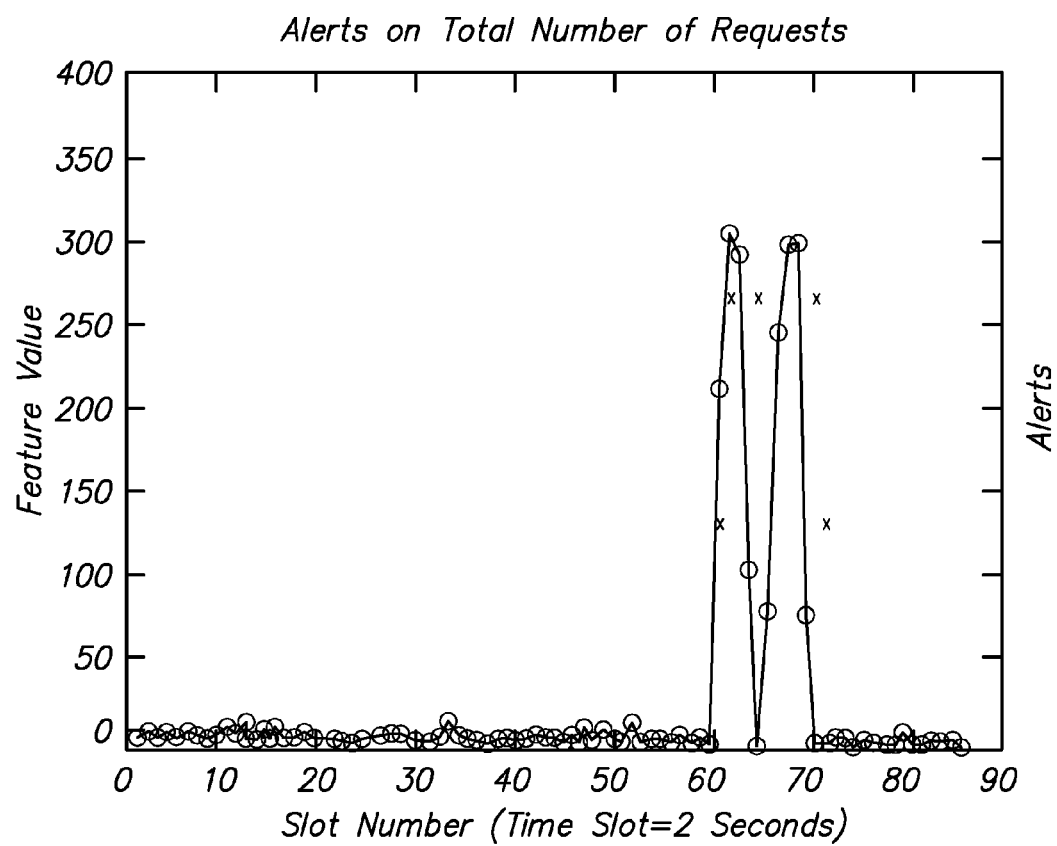
FIGS. 16A-16F illustrates an exemplary SIP network traffic behavior against another exemplary call spam attack.
Figure 16B:
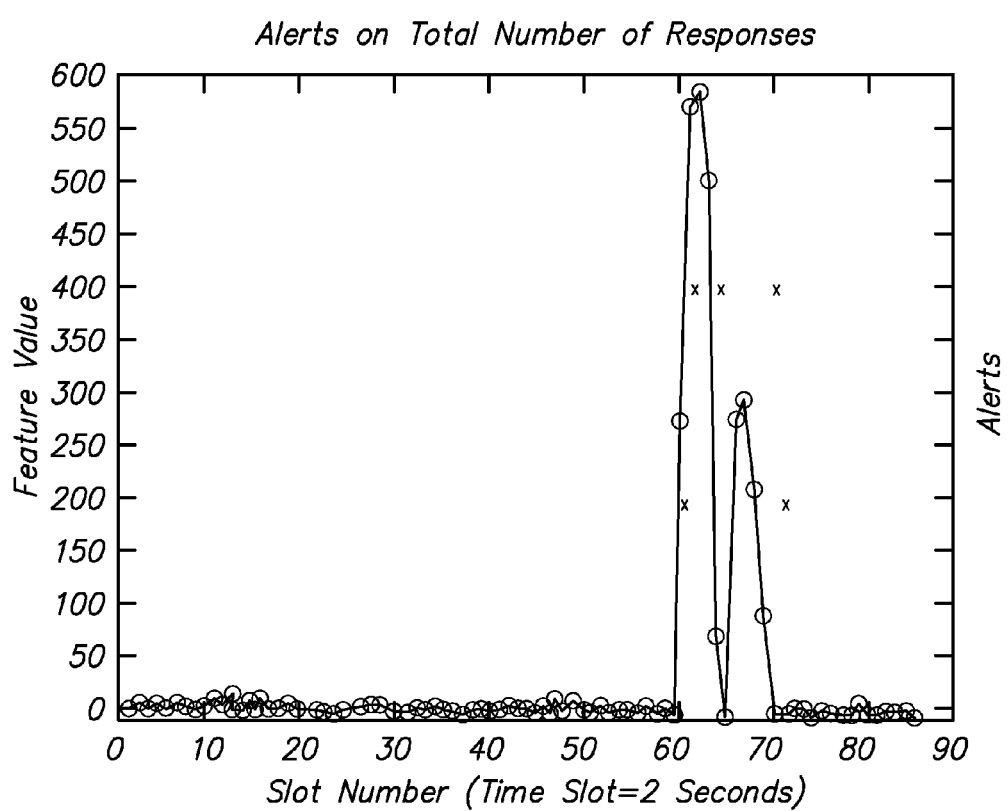
Figure 16C:
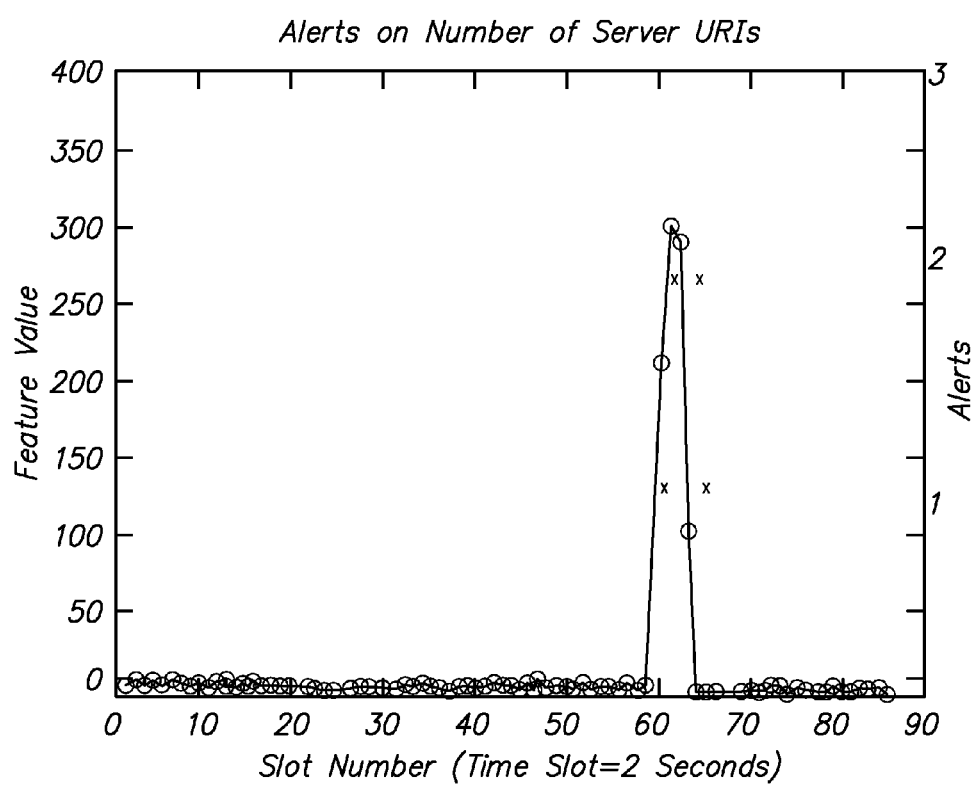
Figure 16D:
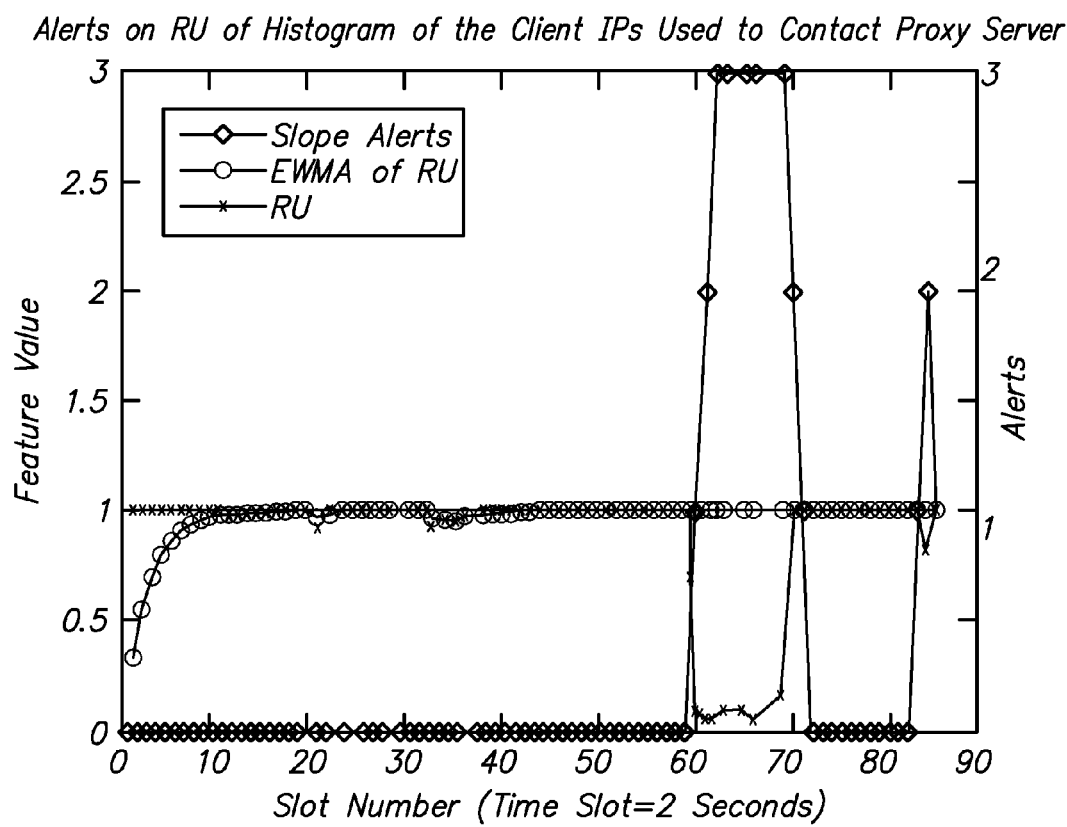
Figure 16E:
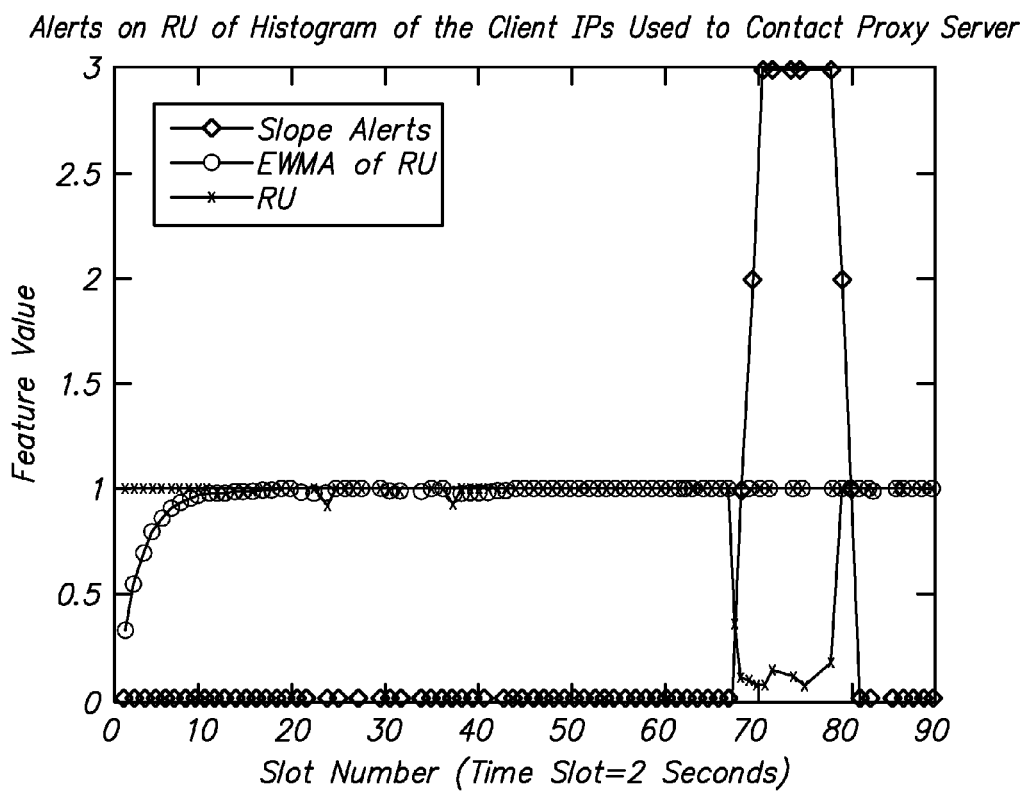
Figure 16F:
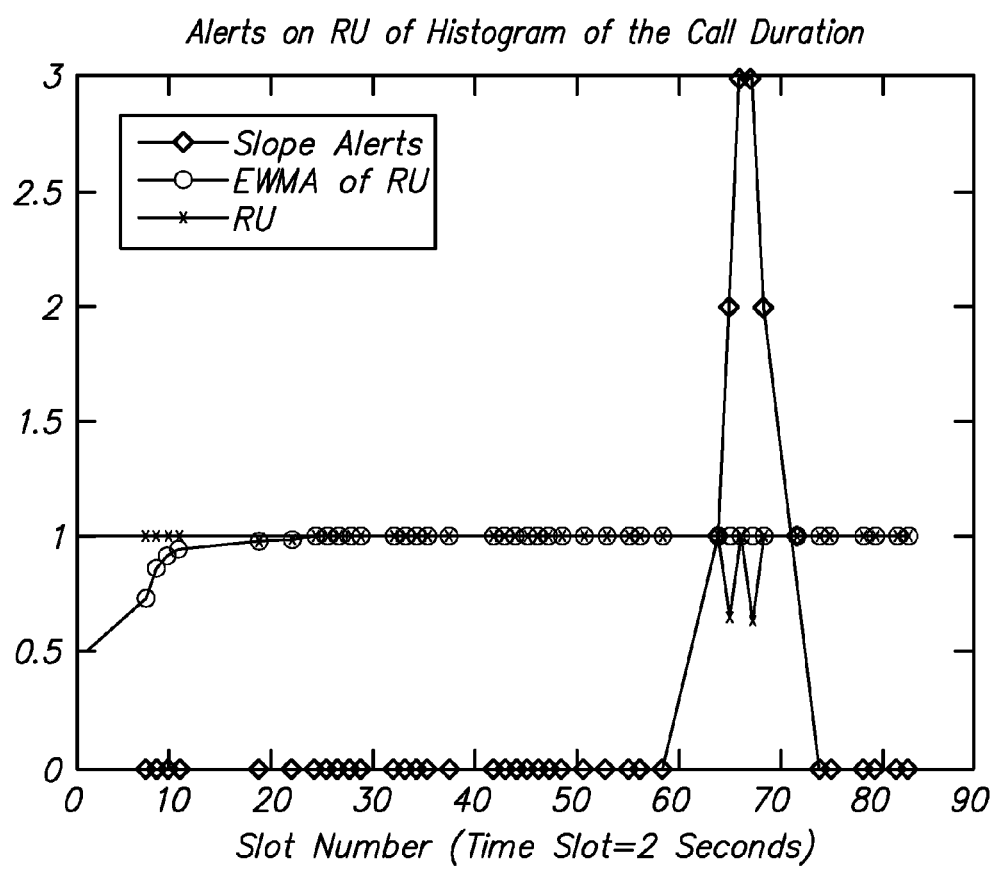

FIG. 14 illustrates an exemplary algorithm of the process 1202-1205 for detecting SIP network traffic anomaly. Here, after the learning period is over, the "slope" s(t) may be monitored and if it is a times greater than the average slope $s_{avg}(t-1)$, or if the second parameter d(t) exceeds the first threshold $\alpha$ (1401), then an alert level is increased (1402). Otherwise, if the second parameter d(t) is less than a second threshold $\alpha'$ (1403), the alert level is decreased (1404). The second threshold $\alpha'$ may be calculated as a sum of the first threshold $\alpha$ and an offset, or as a multiplied product of the first threshold $\alpha$ and a factor, or using some other functional relationship based on the first threshold $\alpha$. The first and second threshold may also be configurable to fine tune the algorithm. In some example, $\alpha$ and $\alpha'$ may be chosen to be the same. If an alert was increased, then the values for feature average and average slope are locked-in (1402), i.e., can be updated (1406, 1407) only when the alert value is reduced to be less than a first level (1405). The first level may be set to zero or other suitable level. False alarms are avoided by having multiple alert levels. In an example, four alert levels may be implemented: Green (alert=0), Yellow (alert=1), Red (alert=2) and Black (alert=3), where each represents a system in continually increasing alert levels. The state of a feature function starts in Green phase at initialization and may be changed progressively across the alert levels on each alert.

This reporting phase is used for reporting the suspicious elements of a feature that are contributing to the anomaly. The reporting phase is applied (1409) only when the alert level exceeds a second level, e.g. the alert level is changed to Black (1408). For instance, if a particular IP address starts sending multiple Registration requests as part of a voice spam or DoS attack, then the UAD_caller would decrease and this anomalous address may be isolated as follows. First, the last "clean histogram", i.e., the histogram corresponding to the last Green state, is maintained that has been seen for the feature. Next, when the feature's phase is changed to Black, the current histogram may be compared with the last clean one to obtain the elements that contribute the most to the change in the histograms. In particular, the set of elements S may be reported that contribute to the top 5 percentile of the change in histogram. This is done by calculating the Relative Entropy $\Sigma_i |H_i \log(H_i)/\log(h_i))|$ of the current histogram H with respect to the last clean one h and sorting the elements according to the value they contribute to the relative entropy. Thus, defining the maximum element as: $s_i=\max_i \epsilon_H |H_i \log(H_i)/\log(h_i))|$, and similarly the second maximum element $s_2$ and so on up to the last element $S_n$, the set S may be defined as: $\{s_1, \ldots, s_i: \Sigma^i_{j=1} s_j < 0.05 \Sigma^n_{j=1} s_j\}$.

As an example, some common potential attacks on VoIP services may include DoS and DDoS attacks on VoIP infrastructure or users, VoIP spam, and worms that exploit VoIP protocols to spread. Such an attack may introduce either a volume surge, a sudden change or deviation in the ratio/distribution statistics or metrics (e.g., randomness) in one or multiple feature functions. Consider an example call spam attack, defined as when a spammer generates many calls, most likely in an automated fashion towards several unsuspecting callees, e.g., automated calls made by telemarketers simultaneously to many callees advertising a product. Thus, by varying the following parameters, a spammer may generate a variety of attacks:

(1) number of callers per spammer IP address;
(2) whether the IP addresses are legitimate or not;
(3) number of IP addresses and;
(4) volume of spam calls.

One such example is a High volume spam: One caller per legitimate IP address from one or few addresses sends large number of calls to random callees. Another such example is a Low volume spam: One caller per legitimate IP address from one or few addresses sends moderate number of calls to random callees. Yet another example is: Many callers per legitimate IP address from one or few addresses send a moderate number of calls to random callees.

The efficacy and efficiency of the above described detection algorithm may be validated with a test bed. An exemplary test bed may consist of a high speed packet analyzer, which can parse layer-7 payloads off-the-wire from network links as fast as 2.5 Gbps. The VoIP packets belonging to the same call may be uniquely identified by their Call-id, using which the control packets (SIP) belonging to the same call may be grouped (sessionalized) into unique sessions. The analyzer may emit an annotated vector per packet that identifies the session ID of the packet along with other details such as caller and callee URI and IP address, type of packet and so on. These vectors may then be processed by the exemplary anomaly detection module, such as described in FIGS. 12, 13 and 14, which performs base-lining of the traffic and emits alerts upon identifying an anomaly. In an example, the test-bed consists of two machines, connected via an OC-48 link (2.5 Gbps). The trace may be replayed from one machine while the other one is configured to sniff packets off-the-wire and runs the packet analyzer as well as the exemplary anomaly detection module. Each machine has two Intel® Xeon™ CPU 3.40 GHz processors and runs the Linux kernel 2.4.21. The packet analyzer and anomaly detector are both single-threaded 32-bit processes and hence the amount of memory available to either of them is the Linux configured per process maximum of 4 Gbytes. Through performance experiments, the packet analyzer is found to be capable of maintaining a line-rate of 2.5 Gbps while processing VoIP packets up to a maximum of 600,000 concurrent calls with new calls arriving at 1000 calls/second.

FIGS. 15A-15F and 16A-16F illustrates exemplary SIP network traffic behavior against exemplary call spam attacks. The efficacy and efficiency of the exemplary anomaly detection module, such as described in FIGS. 12, 13 and 14, against these exemplary call spam attacks are demonstrated. A 3-minute sample of clean traffic trace is merged with a synthetic call spam attack towards the end of the trace. As an example, one existing caller URI and IP address from the trace is selected as the spammer and multiple SIP requests are generated from this caller towards randomly generated callees. Two exemplary attacks are generated:
(1) a high-volume call spam that lasts a duration of 25 seconds, with new calls generated in the first 10 seconds at the rate of 100 calls/second to yield a total of 1000 spam calls in the trace and (2) a low-volume spam, consisting of only 10 calls generated by the spammer in the same time duration of 10 seconds. Each spam call begins with an Invite sent towards a random callee and 100% of the callees respond favorably to the caller by proceeding to take the call. Hence, the spam traffic also consists of Ringing and OK/200 Response packets that are sent in the other direction i.e., from callee to caller. The SIP handshake is completed by the caller sending an ACK in response. Each spam call is generated to last the same duration of 15 second, the spammer may transmit the same automated message to each caller. As an example, none of the callees hang up on the call before it is ended by the callee, thereby each spam call lasts the same time duration. Each call ends with the callee sending a Bye request to which the caller responds with a Bye-Ack. The exemplary anomaly detection module is configured with a time slot of 2 seconds, where the learning period $T_{learn}$ lasts for 40 time slots. The averaging time periods $T_1$ and $T_2$ are 5 and 15 slots respectively. FIG. 15 shows the efficacy of the exemplary base-lining algorithm such as described in FIG. 13, since each feature function can be observed to be stationary before the attack. The attack is detected almost instantaneously around time slot 60 when the features of total requests, total responses and total unique callee URIs reach the Black (Alert value=3) alert stages. Further note in FIGS. 15D-15F that the normalized entropy, or relative uncertainty (RU), of histograms for the caller (denoted as client) IPs and URIs and call duration are dominated by the spammer and thereby the UAD for these histograms exhibit sharp decreases around the beginning of the attack. During the time when the alerts for these features is at Black stage, the current histogram is compared with the last clean histogram i.e., the one at time slot 60 and are also able to obtain the caller URI and caller IP involved in the attack (not shown in figures). Also there are two peaks observed in FIG. 16A where the first peak occurs close to the beginning of spam and consists of the flood of Invites and the second peak occurs close to the end of the spam consisting of Bye packets. Since, the first call belonging to the call spam completes 15 seconds after the beginning of the call spam, the histogram for call duration exhibits anomalies much later than other features i.e., around time slot=70, when the call duration of spammers begins to dominate the histogram. Moreover, the exemplary anomaly detection method is able to extract the duration of each spammer as the correct value of 15 seconds. The efficacy of the exemplary anomaly detection in detecting even the low volume attacks is highlighted in FIG. 15 which shows the performance in the presence of the low volume call spam. In this case, the spammer is able to hide within the background traffic quite well as none of the volume features of total number of requests, total number of responses} or number of callee URIs exhibits any significant change during the spam period. However, the intrinsic behavior of the spammer of generating multiple requests from the same client URI and IP address results in the detection of the attack via the features that track user behavior. Hence, the UAD for callee URI and IP address exhibit three consecutive alerts, leading to the extraction of the suspect URI and IP address around time slot 63.

We claim:

1. A method for session initiation protocol (SIP) server identification comprising:
   tallying a plurality of distinct uniform resource indicators (URIs) associated with one or more source IP address in a plurality of SIP request messages to produce one or more first tally count;
   tallying a plurality of distinct URIs associated with one or more destination IP address in the plurality of SIP request messages to produce one or more second tally count;
   tallying a plurality of distinct URIs associated with one or more source IP address in a plurality of SIP response messages to produce one or more third tally count;
   tallying a plurality of distinct URIs associated with one or more destination IP address in the plurality of SIP response messages to produce one or more fourth tally count; and
   identifying a SIP server candidate corresponding to an IP address upon the corresponding first tally count exceeds a first threshold, the corresponding second tally count exceeds a second threshold, the corresponding third tally count exceeds a third threshold, and the corresponding fourth tally count exceeds a fourth threshold.

2. The method of claim 1 further comprising:
comparing one or more source port in the plurality of SIP response messages associated with the SIP server candidate to one or more pre-determined SIP service ports;
incrementing a count upon each equal comparison; and
identifying the SIP server candidate to be a SIP server upon the count exceeding a fifth threshold.

3. The method of claim 1 further comprising:
examining one or more method field of one or more SIP messages associated with the SIP server; and
identifying a SIP server type according to the one or more method field.

4. The method of claim 3 wherein the one or more method field comprises a register and the SIP server type comprises a registrar.

5. The method of claim 3 wherein the one or more method field comprises an invite and the SIP server type comprises a call proxy.

* * * * *